United States Patent
Matsui et al.

(10) Patent No.: US 9,739,544 B2
(45) Date of Patent: Aug. 22, 2017

(54) SURFACE TREATMENT METHOD FOR ALUMINUM HEAT EXCHANGERS

(71) Applicants: Nippon Paint Surf Chemicals Co., Ltd., Tokyo (JP); Denso Corporation, Aichi (JP)

(72) Inventors: Norizumi Matsui, Tokyo (JP); Akihiro Mizuno, Tokyo (JP); Yuko Wada, Tokyo (JP); Junsuki Hokka, Tokyo (JP); Kenji Nakamura, Kariya (JP); Takayuki Hirose, Kariya (JP); Kengo Kobayashi, Kariya (JP)

(73) Assignees: Nippon Paint Surf Chemicals Co., Ltd., Tokyo (JP); Denso Corporation, Aichi (JP)

( * ) Notice: Subject to any disclaimer, the term of this patent is extended or adjusted under 35 U.S.C. 154(b) by 23 days.

(21) Appl. No.: 14/382,922

(22) PCT Filed: Mar. 8, 2013

(86) PCT No.: PCT/JP2013/056547
§ 371 (c)(1),
(2) Date: Sep. 4, 2014

(87) PCT Pub. No.: WO2013/133434
PCT Pub. Date: Sep. 12, 2013

(65) Prior Publication Data
US 2015/0013947 A1    Jan. 15, 2015

(30) Foreign Application Priority Data

Mar. 9, 2012   (JP) ................. 2012-053031
Mar. 8, 2013   (JP) ................. 2013-047340

(51) Int. Cl.
| | |
|---|---|
| C23C 22/40 | (2006.01) |
| C23C 22/56 | (2006.01) |
| F28F 13/18 | (2006.01) |
| C23C 22/44 | (2006.01) |
| F28F 19/06 | (2006.01) |
| C23C 22/83 | (2006.01) |
| B23K 1/00 | (2006.01) |
| F28F 21/08 | (2006.01) |
| B23K 1/20 | (2006.01) |
| C23C 22/34 | (2006.01) |
| B05D 3/10 | (2006.01) |
| B05D 3/02 | (2006.01) |
| B23K 101/14 | (2006.01) |
| B23K 103/10 | (2006.01) |

(52) U.S. Cl.
CPC ............ *F28F 13/18* (2013.01); *B23K 1/0012* (2013.01); *B23K 1/20* (2013.01); *C23C 22/44* (2013.01); *C23C 22/83* (2013.01); *F28F 19/06* (2013.01); *F28F 21/084* (2013.01); *B05D 3/0254* (2013.01); *B05D 3/102* (2013.01); *B05D 2202/25* (2013.01); *B23K 2201/14* (2013.01); *B23K 2203/10* (2013.01)

(58) Field of Classification Search
CPC ....... C23C 22/34; C23C 22/361; C23C 22/40; C23C 22/44; C23C 22/56; C23C 22/85; C23C 22/83
See application file for complete search history.

(56) References Cited

U.S. PATENT DOCUMENTS

| | | |
|---|---|---|
| 4,992,115 A | 2/1991 | Ikeda |
| 6,361,833 B1 | 3/2002 | Nakada et al. |
| 6,554,916 B2 | 4/2003 | Kojima et al. |
| 6,869,677 B1 | 3/2005 | Uehara et al. |
| 7,503,381 B2 | 3/2009 | Inbe et al. |
| 2002/0040742 A1 | 4/2002 | Kojima et al. |
| 2003/0098091 A1 | 5/2003 | Opdycke et al. |
| 2003/0168127 A1 | 9/2003 | Hamamura et al. |

(Continued)

FOREIGN PATENT DOCUMENTS

| | | |
|---|---|---|
| CN | 1323976 A | 11/2001 |
| CN | 1330729 A | 1/2002 |

(Continued)

OTHER PUBLICATIONS

Office Action in Chinese Patent Application No. 201380012367.9, dated Aug. 21, 2015.

(Continued)

*Primary Examiner* — Lois Zheng
(74) *Attorney, Agent, or Firm* — Knobbe, Martens, Olson & Bear, LLP

(57) ABSTRACT

A surface treatment method for aluminum heat exchangers including (a) a step wherein a chemical conversion coating film is formed on the surface of an aluminum heat exchanger by subjecting the aluminum heat exchanger to chemical conversion using a chemical conversion agent; (b) a step wherein the aluminum heat exchanger, the surface of which has been provided with a chemical conversion coating film in step (a), is brought into contact with a hydrophilizing agent that contains a hydrophilic resin; and (c) a step wherein a hydrophilized coating film is formed on the surface of the aluminum heat exchanger by baking the aluminum heat exchanger, which has been subjected to a contact treatment in step (b). The chemical conversion agent used in step (a) contains zirconium and/or titanium in an amount of 5-5,000 ppm by mass in total, vanadium in an amount of 10-1,000 ppm by mass and a metal stabilizer in an amount of 5-5,000 ppm by mass. In addition, the chemical conversion agent used in step (a) has a pH of 2-6.

17 Claims, No Drawings

(56) References Cited

U.S. PATENT DOCUMENTS

| | | |
|---|---|---|
| 2003/0209293 A1 | 11/2003 | Sako et al. |
| 2003/0213533 A1 | 11/2003 | Sako et al. |
| 2006/0027629 A1 | 2/2006 | Inbe et al. |
| 2010/0170594 A1 | 7/2010 | Inbe et al. |
| 2013/0034743 A1 | 2/2013 | Bannai et al. |
| 2013/0284049 A1 | 10/2013 | Miura et al. |

FOREIGN PATENT DOCUMENTS

| | | |
|---|---|---|
| CN | 1730725 A | 2/2006 |
| EP | 1136591 A1 | 9/2001 |
| EP | 1324274 A2 | 7/2003 |
| JP | H01-208477 A | 8/1989 |
| JP | 2000-199077 | 7/2000 |
| JP | 2000-345362 A | 12/2000 |
| JP | 2001-181860 | 7/2001 |
| JP | 2002-30460 | 1/2002 |
| JP | 2002-030460 A | 1/2002 |
| JP | 2002-060699 A | 2/2002 |
| JP | 2002-275650 A | 9/2002 |
| JP | 2004-510882 | 4/2004 |
| JP | 2004-270030 A | 9/2004 |
| JP | 2005-008975 | 1/2005 |
| JP | 2005-036161 A | 2/2005 |
| JP | 2006-69197 | 3/2006 |
| JP | 2007-238976 A | 9/2007 |
| JP | 2008-88552 | 4/2008 |
| JP | 2008-231418 A | 10/2008 |
| JP | 2009-034589 A | 2/2009 |
| JP | 2009-132952 A | 6/2009 |
| JP | 2010-261058 | 11/2010 |
| JP | 2011-042842 A | 3/2011 |
| JP | 2011-131206 A | 7/2011 |
| JP | 2011-161876 | 8/2011 |
| JP | 2011-195942 A | 10/2011 |
| JP | 2011-214105 | 10/2011 |
| JP | 2012-17524 | 1/2012 |
| WO | WO 00/22188 A1 | 4/2000 |
| WO | WO 02/28550 A1 | 4/2002 |
| WO | WO 2011/065482 A1 | 6/2011 |
| WO | WO 2011/099460 A1 | 8/2011 |

OTHER PUBLICATIONS

Office Action in Chinese Patent Application No. 201480019222.6, dated Nov. 2, 2016.
International Search Report for International Application No. PCT/JP2012/074059, dated Dec. 25, 2012.
International Search Report for International Application No. PCT/JP2014/059901, dated Jul. 8, 2014.
Notification that the Japan Patent Office has received an Information Statement by a third party issued to Japanese Application No. 2011-205809, dated Oct. 27, 2015.
Notification that the Japan Patent Office has received an Information Statement by a third party issued to Japanese Application No. 2013-047340 dated, Jul. 19, 2016.
Office Action for Chinese Patent Application No. 201280045677.6 dated, Mar. 26, 2015.
Office Action for Czech Patent Application No. 2014-179, dated Jul. 25, 2016.
Office Action for Japanese Patent Application No. 2013-047340, dated Oct. 18, 2016.
Office Action for U.S. Appl. No. 14/346,132, dated May 20, 2016.

SURFACE TREATMENT METHOD FOR ALUMINUM HEAT EXCHANGERS

This application is the U.S. National Phase under 35 U.S.C. §371 of International Application PCT/JP2013/056547, filed Mar. 8, 2013, designating the U.S., and published in Japanese as WO 2013/133434 on Sep. 12, 2013, which claims priority to Japanese Patent Application No. 2012-053031, filed Mar. 9, 2012; and to Japanese Patent Application No. 2013-047340, filed Mar. 8, 2013, the entire contents of which are incorporated herein by reference.

TECHNICAL FIELD

The present invention relates to a surface treatment method for an aluminum heat exchanger.

BACKGROUND ART

An aluminum heat exchanger used in automobile air conditioner, from the viewpoint of a heat exchange efficiency improvement, usually has a plurality of fins arranged at narrow intervals in order to make the surface area thereof as large as possible, as well as tubes for coolant supply arranged tangled in these fins. With the heat exchanger of such a complicated structure, the moisture in the atmosphere during air-conditioner operation adheres as condensed water on the surfaces of the fins and tubes (hereinafter referred to as "fins, etc."). However, in the case of the wettability of the surfaces of the fins, etc. is inferior, the ventilation resistance increases by, for example, the adhered condensed water becoming substantially semispherical droplets and being present in a bridged form between the fins, a result of which there is a problem in that the smooth flow of evacuated air is inhibited, and the heat exchange efficiency declines. In order to suppress such a phenomenon, normally, hydrophilization treatment has been conducted on the surfaces of the fins, etc.

In addition, the aluminum or alloys thereof constituting the fins, etc. are essentially materials excelling in rust-prevention. However, when condensed water stagnates for a long time on the surfaces of fins, etc., oxygen concentration cells are locally formed and the corrosion reactions advance, and if contaminant components in the atmosphere further adhere thereto, the corrosion reactions will be promoted. The products generated from the corrosion reactions, for example, white rust, deposits on the surface of fins, etc., thereby the heat exchange characteristic being inhibited, and further, there are problems such that the white rust is discharged to the atmosphere by the blower fan.

For this reason, a variety of technologies for suppressing the generation of white rust and improving corrosion resistance have been proposed. For example, as a chemical conversion treatment agent to impart favorable corrosion resistance to surfaces of aluminum or alloy materials thereof, chemical conversion treatment agents have been disclosed that contain titanium-complex fluoride ions, pentavalent vanadium compound ions and zirconium-complex fluoride ions (refer to Patent Document 1).

In addition, as a chemical conversion treatment agent that imparts favorable corrosion resistance to the surfaces of an aluminum heat exchanger, chemical conversion treatment agents have been disclosed that contain decavanadate ions corresponding to the pentavalent vanadium compound ions and zirconium-complex fluoride ions (refer to Patent Document 2).

Here, the aluminum heat exchanger used in automobile air conditioner is manufactured by arranging and assembling the plurality of fins, etc. as mentioned above, and then joining these. Upon joining, a strong, dense oxide film is formed on the surface of aluminum; therefore, joining by way of a brazing method that is not a mechanical joining method is not easy, and thus schemes such as brazing in vacuum have been necessary.

In recent years, as a means to effectively remove the oxide film on the surface to address this, the flux brazing method using a halogen-based flux has been developed, and thereamong, the Nocolok brazing process of flux brazing in nitrogen gas (hereinafter referred to as "NB process") is widely used from the viewpoint of the control of brazing is simple and the processing cost is inexpensive. With this NB process, after the plurality of fins, etc. are arranged and assembled, the fins, etc. are brazed in nitrogen gas using a flux such as $KAlF_4$ and $K_2AlF_5$.

However, in the aluminum heat exchanger manufactured by the NB process (hereinafter referred to as "NB heat exchanger"), flux inevitably remains on the surfaces of the fins, etc. Given this, the surface state of the fins, etc. (electrical potential state, etc.) will be non-uniform, a result of which a uniform chemical conversion film and hydrophilized film cannot be obtained by subsequent treatments, and thus there has been a problem in that favorable corrosion resistance and hydrophilicity are not obtained.

Therefore, as a surface treatment method for a NB heat exchanger that imparts favorable odor resistance, which is an important characteristic as an automobile air-conditioning application, in addition to favorable corrosion resistance and hydrophilicity, technology has been disclosed that after the NB heat exchanger is subjected to a chemical conversion treatment by dipping in a chemical conversion treatment agent containing at least one among zirconium-complex fluoride ions and titanium-complex fluoride ions, then the NB heat exchanger is subjected to a hydrophilization treatment by dipping in a hydrophilization treatment agent containing polyvinyl alcohol, polyoxyalkylnene-modified polyvinyl alcohol, inorganic cross-linker, guanidine compound, etc. (refer to Patent Document 3).

In addition, as a surface treatment method that can maintain the hydrophilicity, high corrosion resistance, antimicrobial property and odor resistance on the surface of aluminum or an aluminum alloy material over a long time period, a technology has been disclosed that sequentially passes an aluminum or aluminum alloy substrate surface through a surface adjustment step to establish a state suited to the formation of a chemical conversion film, a water washing step, a step of forming a first protective layer consisting of the chemical conversion film on the surface of the aluminum or aluminum alloy substrate, a water washing step, a step of coating a second protective layer that is an organic film on the first protective layer, and a drying step (refer to Patent Document 4). With this technology, the first protective layer is formed by a chemical conversion treatment liquid containing vanadium and at least one type of metal selected from titanium, zirconium and halfnium, the second protective layer is formed with a composition containing (1) a chitosan derivative and solubilizer, (2) a modified-polyvinyl alcohol made by a hydrophilic polymer graft polymerizing at a side chain of polyvinyl alcohol, and (3) a water-soluble cross-linker.

In addition, as technology for imparting superior corrosion resistance to aluminum-based metal materials, etc., technology has been disclosed that is related to surface treatment agents with essential components of a resin compound having a specific structure, a vanadium compound, and a specific metal compound (refer to Patent Document 5). With this technology, it is said that, by containing ascorbic acid, etc. as the water-soluble organic compound having at least one functional group selected from the group consisting of a hydroxyl group, carbonyl group, carboxyl group, phosphate group, phosphonate group, primary to tertiary amino group and amide group, for example, not only is the vanadium compound reduced, but also the stability of the vanadium compound is remarkably improved, and a superior corrosion resistance imparting effect can be maintained over a long time period. In addition, it is said that a uniform film can be formed, and the level of corrosion resistance can be improved.

[Patent Document 1] Japanese Unexamined Patent Application, Publication No. 2010-261058

[Patent Document 2] Japanese Unexamined Patent Application (Translation of PCT Application), Publication No. 2004-510882

[Patent Document 3] Japanese Unexamined Patent Application, Publication No. 2006-69197

[Patent Document 4] Japanese Unexamined Patent Application, Publication No. 2011-161876

[Patent Document 5] Japanese Unexamined Patent Application, Publication No. 2001-181860

DISCLOSURE OF THE INVENTION

Problems to be Solved by the Invention

In recent years, in addition to improvements in corrosion resistance, an improvement in moisture resistance has also become important for an aluminum heat exchanger for automobile air-conditioning. Herein, the index of corrosion resistance as mentioned above is white rust; whereas, the index of moisture resistance is blackening. White rust is a localized corrosion phenomenon that occurs due to corrosion factors such as oxygen, water and chloride ion; whereas, blackening is an overall corrosion phenomenon occurring due to the presence of oxygen, water and heat. For this reason, in an aluminum heat exchanger for automobile air-conditioners which are under an environment exposed to high heat, it has been desired to suppress the occurrence of blackening to improve moisture resistance, along with corrosion resistance.

However, the technology of Patent Document 1 does not carry out hydrophilization treatment due to the treatment target not being a heat exchanger. In addition, this technology makes no consideration for moisture resistance, and thus is not technology for improving moisture resistance.

For the technology of Patent Document 2, the treatment target is an aluminum heat exchanger; however, no consideration is made for moisture resistance. This technology focuses attention on imparting favorable corrosion resistance, and thus is not technology for improving the moisture resistance.

The technology of Patent Document 3 has the treatment target of aluminum heat exchanger for automobile air-conditioner, and is technology for imparting favorable odor resistance in addition to favorable corrosion resistance and hydrophilicity; however, it is not technology focusing on moisture resistance. For this reason, with this technology, no consideration is made for moisture resistance, and thus superior moisture resistance is not obtained. In addition, in Patent Document 3, embodiments arrived at by containing vanadium ion in predetermined amounts in the chemical conversion treatment agent are not described, and thus for the corrosion resistance in Patent Document 3, the evaluation time thereof is drastically short compared to the present invention, and is lower in level than the present invention.

The technology of Patent Document 4 has a treatment target of heat exchanger made of aluminum or made of aluminum alloy, and is technology for imparting hydrophilicity, high corrosion resistance, antimicrobial property, moisture resistance and odor resistance for a long time period; however, for the corrosion resistance of this technology, the evaluation time thereof is drastically short compared to the present invention. In addition, also for the moisture resistance of this technology, the evaluation temperature thereof is drastically lower than the present invention, and thus is a lower level than the present invention.

For the technology of Patent Document 5, since the treatment target is not a heat exchanger, hydrophilization treatment is not carried out. In addition, with this technology, no consideration is made for moisture resistance, and thus is not technology for raising the moisture resistance. Furthermore, this technology is technology related to coating-type surface treatment agents, and thus is not technology related to chemical conversion treatment agents of reaction type like the present invention.

In accordance with the above, the current situation is that up to now a surface treatment method has not been established that is capable of imparting superior corrosion resistance (white rust resistance) and moisture resistance (blackening resistance) to an aluminum heat exchanger used in an automobile air-conditioner.

The present invention has been made taking the above into consideration, and an object thereof is to provide a surface treatment method capable of imparting superior corrosion resistance (white rust resistance) and moisture resistance (blackening resistance) to the aluminum heat exchanger being used in the automobile air-conditioner.

Means for Solving the Problems

In order to achieve the above-mentioned object, the present invention provides a surface treatment method for an aluminum heat exchanger including: (a) a step of forming a chemical conversion film on a surface of the aluminum heat exchanger by way of a chemical conversion treatment agent; (b) a step of bringing the aluminum heat exchanger on which the chemical conversion film was formed on the surface in the step (a) into contact with a hydrophilization treatment agent containing a hydrophilic resin; and (c) a step of forming a hydrophilized film on the surface by baking the aluminum heat exchanger that was contact treated in the step (b), in which the chemical conversion treatment agent used in the step (a) contains at least one among zirconium and titanium, a content thereof being 5 to 5,000 ppm by mass in total, contains vanadium, a content thereof being 10 to 1,000 ppm by mass, contains a metal stabilizer, a content thereof being 5 to 5,000 ppm by mass, and has a pH of 2 to 6.

The metal stabilizer is preferably at least one selected from a group consisting of organic compounds having reducibility and iminodiacetic acid derivatives.

In the chemical conversion film formed in the step (a), preferably a total of an amount of zirconium and an amount of titanium is 5 to 300 mg/m$^2$, an amount of vanadium is 1 to 150 mg/m$^2$, and an amount of metal stabilizer is 0.5 to 200 mg/m$^2$ in terms of carbon, and a film amount of the hydrophilized film formed in the step (c) is 0.05 to 5 g/m$^2$.

The chemical conversion film formed in the step (a) is preferably contains both zirconium and titanium.

The hydrophilization treatment agent used in the step (b) preferably further contains at least one among a guanidine compound represented by general formula (1) below and a salt thereof,

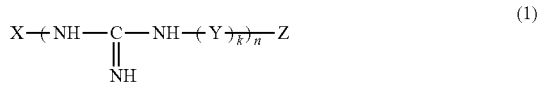

In formula (1), Y represents —C(=NH)—(CH$_2$)$_m$—, —C(=O)—NH—(CH$_2$)$_m$—, or —C(=S)—NH—(CH$_2$)$_m$—. m represents an integer of 0 to 20; n represents a positive integer; k represents 0 or 1. X represents hydrogen, an amino group, hydroxyl group, methyl group, phenyl group, chlorophenyl group or methylphenyl group. Z represents hydrogen, an amino group, hydroxyl group, methyl group, phenyl group, chlorophenyl group, methylphenyl group, or a polymer represented by general formula (2) below having a mass average molecular weight of 200 to 1,000,000.

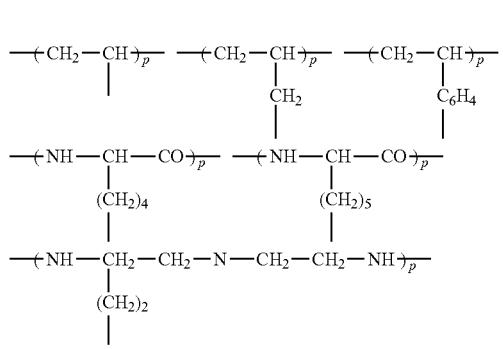

In formula (2), p represents a positive integer.

The guanidine compound and salt thereof are preferably a compound having a biguanide structure represented by general formula (3) below and a salt thereof.

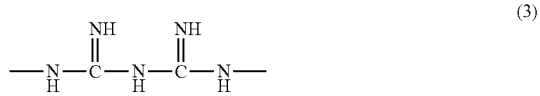

The hydrophilization treatment agent used in the step (b) preferably further contains at least one selected from a group consisting of phosphoric acid, condensed phosphoric acid, phosphonic acid, derivatives thereof and lithium ion.

The hydrophilic resin in the hydrophilization treatment agent used in the step (b) preferably further contains at least one among a polyvinyl alcohol and modified-polyvinyl alcohol having a degree of saponification of at least 90%.

The aluminum heat exchanger is preferably an aluminum heat exchanger that was flux brazed according to the Nocolok brazing process.

Effects of the Invention

According to the present invention, it is possible to provide a surface treatment method that is capable of imparting superior corrosion resistance (white rust resistance) and moisture resistance (blackening resistance) to the heat exchanger being used in automobile air-conditioner.

PREFERRED MODE FOR CARRYING OUT THE INVENTION

Hereinafter, embodiments of the present invention will be explained in detail.

A surface treatment method according to the present embodiment carries out surface treatment of an aluminum heat exchanger. The surface treatment method according to the present embodiment includes (a) a chemical conversion treatment step, (b) a hydrophilization treatment step, and (c) a baking step.

In the following explanation, white rust resistance will be explained as corrosion resistance and blackening resistance as moisture resistance.

Heat Exchanger

The treatment target of the surface treatment method according to the present embodiment is a heat exchanger made of aluminum, and is preferably used as an automobile air conditioner application. Herein, "made of aluminum" indicates making from aluminum or aluminum alloys (hereinafter simply referred to as "aluminum").

As stated above, the aluminum heat exchanger according to the present embodiment has a plurality of fins arranged in narrow intervals in order to increase the surface area thereof as much as possible, as well as tubes for coolant supply arranged tangled in these fins, from the viewpoint of a heat exchange efficiency improvement. In addition, after assembling these fins, etc., for example, brazing is performed using flux in nitrogen gas, and in this case, the flux inevitably remains on the surfaces of the fins, etc. For this reason, the surface state of the fins, etc. (electric potential state, etc.) becomes non-uniform, and it is difficult to obtain a uniform chemical conversion film and hydrophilized film by conventional chemical conversion treatment agent.

It is possible to use a halogen-based flux that is commonly used in the NB process as the flux. As halogen-based flux, it is possible to use at least one type selected from the group consisting of $KAlF_4$, $K_2AlF_5$, $K_3AlF_6$, $CsAlF_4$, $Cs_3AlF_6$ and $Cs_2AlF_5$.

(a) Chemical Conversion Treatment Step (a) The chemical conversion treatment step of the present embodiment is a step of chemical conversion treating the aluminum heat exchanger with a chemical conversion treatment agent containing at least one among zirconium and titanium, the content thereof being 5 to 5,000 ppm by mass in total, containing vanadium, the content thereof being 10 to 1,000 ppm by mass, containing a metal stabilizer, the content thereof being 5 to 5,000 ppm by mass, and having a pH of 2 to 6, thereby forming a chemical conversion film on the surfaces thereof.

Prior to chemical conversion treating, the aluminum heat exchanger may be acid washed as necessary with the object of further improving the chemical conversion treatment effect. The conditions of acid washing are not particularly limited, and treatment conditions used heretofore can be employed as the acid wash treatment of the aluminum heat exchanger.

Herein, zirconium, titanium and vanadium all exist as various ions such as complex ions in the chemical conversion treatment agent of the present embodiment. For this reason, in the present specification, the respective contents of zirconium, titanium and vanadium indicate values of various ions in terms of metal element.

The chemical conversion treatment agent of the present embodiment contains at least one of zirconium ion and titanium ion, and vanadium ion, and is obtained by dissolving at least one of a zirconium-based compound and a titanium-based compound as well as a vanadium-based compound in water. In other words, the chemical conversion treatment agent of the present embodiment is a solution establishing at least one of zirconium ion and titanium ion as well as vanadium ion as active species. A preferred chemical conversion treatment agent of the present embodiment contains all of zirconium ion, titanium ion and vanadium ion as active species.

Zirconium ion transforms by the chemical conversion reaction, whereby a zirconium precipitate in which zirconium oxide is the main constituent precipitates on the aluminum surface. As the zirconium-based compound that is the supply source of zirconium ion, in addition to zirconium compounds such as fluorozirconic acid and zirconium fluoride, salts of lithium, sodium, potassium, ammonium, etc. of these can be exemplified. In addition, it is possible to use zirconium-based compound produced by dissolving a zirconium compound such as zirconium oxide in a fluoride such as hydrofluoric acid. These zirconium-based compounds have fluorine, and thus have a function of etching the aluminum surface.

The titanium ion changes by the chemical conversion reaction, whereby a titanium precipitate in which titanium oxide is the main constituent precipitates on the aluminum surface. Since the titanium ion has lower precipitation pH than the above-mentioned zirconium ion, the titanium precipitate itself tends to precipitate, thereby precipitation of the aforementioned zirconium precipitate and vanadium precipitate described later can be promoted, a result of which primarily the film amount of the chemical conversion film formed from these precipitates can be increased. In particular, in the case of the aluminum heat exchanger being a flux brazed aluminum heat exchanger, the titanium ion easily precipitates in the vicinity of flux remaining on the surface of the aluminum heat exchanger, which can cause titanium precipitate to be caused.

As the titanium-based compound that is the supply source of titanium ion, in addition to titanium compounds such as fluorotitanic acid and titanium fluoride, salts of lithium, sodium, potassium, ammonium, etc. of these can be exemplified. In addition, it is possible to use titanium-based compound produced by dissolving a titanium compound such as titanium oxide in a fluoride such as hydrofluoric acid. These titanium-based compounds have fluorine similarly to the above-mentioned zirconium-based compound, and thus have a function of etching the aluminum surface. In addition, the etching function thereof is higher than the above-mentioned zirconium-based compound.

In the present embodiment, a chemical conversion film containing at least one among zirconium and titanium as well as vanadium is formed by containing at least one of zirconium ion and titanium ion as well as vanadium ion in the chemical conversion treatment agent. Vanadium ion has a characteristic of precipitating at a lower pH than titanium ion, whereby a vanadium precipitate in which vanadium oxide is the main constituent precipitates on the aluminum surface. In more detail, vanadium ion is converted to vanadium oxide by reduction reaction, whereby vanadium precipitate is caused on the aluminum surface.

Vanadium precipitate differs from zirconium precipitate and titanium precipitate, which have a characteristic of entirely covering the aluminum surface with the exception of a portion thereof, and has a characteristic of tending to precipitate on the segregated matter of the aluminum surface on which zirconium precipitate and titanium precipitate are hardly formed. According to the chemical conversion treatment agent of the present embodiment, it is thereby possible to densely form a chemical conversion film having high coatability mainly by zirconium precipitate, titanium precipitate and vanadium precipitate, compared to conventional chemical conversion treatment agents free of vanadium ion.

In addition, the vanadium precipitate exhibits a self-recovery effect similarly to conventional chromium films, by zirconium ion or titanium ion coexisting, and thus has a superior characteristic in film formability. In other words, a trace amount of vanadium ion moderately elutes from the vanadium precipitate, and the eluted vanadium ion oxidizes the aluminum surface to passivate, thereby self-recovering, and favorable corrosion resistance is maintained. On the other hand, in the case of vanadium ion not being under the coexistence with zirconium ion or titanium ion, it is difficult for vanadium precipitate to be caused, and even if vanadium precipitate exists, vanadium ion will elute in a large quantity from the precipitate thereof, and the above such self-recovery effect will not be obtained.

In the present embodiment, preferably, a chemical conversion film containing zirconium, titanium and vanadium is formed by containing zirconium ion, titanium ion and vanadium ion in the chemical conversion treatment agent. By using an active treatment agent containing all of zirconium ion, titanium ion and vanadium ion as active species, in the case of using an aluminum heat exchanger that has been flux brazed in particular, it is possible to more densely form a chemical conversion film having high coatability, even in the vicinity of flux.

A divalent to pentavalent vanadium compound can be used as the vanadium-based compound. More specifically, metavanadate, ammonium metavanadate, sodium metavanadate, vanadium pentoxide, vanadium oxytrichloride, vanadyl sulfate, vanadyl nitrate, vanadyl phosphate, vanadium oxide, vanadium dioxide, vanadium oxy-acetylacetonate, vanadium chloride, etc. can be exemplified. These vanadium-based compounds do not have fluorine; therefore, there is no function of etching the aluminum surface.

In the present embodiment, a quadrivalent or pentavalent vanadium compound is preferable, and more specifically, vanadyl sulfate (quadrivalent) and ammonium metavanadate (pentavalent) are preferably used.

As mentioned above, with the chemical conversion treatment agent of the present embodiment, the total content of zirconium ion and titanium ion is 5 to 5,000 ppm by mass in terms of metal, and the content of vanadium ion is 10 to 1,000 ppm by mass in terms of metal. By satisfying these, the corrosion resistance and moisture resistance of the aluminum heat exchanger drastically improve, as well as favorable hydrophilicity and odor resistance being obtained, due to the synergy from combining with the hydrophilization treatment described later.

In addition, from the viewpoint of the above-mentioned effects being further enhanced, the total content of zirconium ion and titanium ion is preferably 5 to 3,000 ppm by mass in terms of metal, the content of zirconium is preferably 5 to 3,000 ppm by mass, the content of titanium is preferably 5 to 500 ppm by mass, and the content of vanadium is preferably 10 to 500 ppm by mass.

The chemical conversion treatment agent of the present embodiment contains a metal stabilizer that causes the respective metal ions consisting of zirconium ion, titanium ion and vanadium ion to be stabilized. The metal stabilizer used in the present embodiment forms a complex by chelate bonding or the like with zirconium ion, vanadium ion and titanium ion in the chemical conversion treatment agent. The respective metal ions consisting of zirconium ion, vanadium ion and titanium ion are thereby stabilized in the chemical conversion treatment agent.

Here, the respective metal ions consisting of zirconium ion, titanium ion and vanadium ion each have unique precipitation pHs as mentioned above. For this reason, with conventional chemical conversion treatment agents, a chemical conversion film is formed by the respective metal ions precipitating in order from lowest precipitation pH by raising the pH at the interface accompanying the etching reaction of the treated material surface.

In contrast, with the chemical conversion treatment agent of the present embodiment, since the respective metal ions form complexes to stabilize from the action of the metal stabilizer, the precipitation pHs rise. For this reason, the respective metal ions precipitate simultaneously as complexes, at a higher pH than the precipitation pHs unique to the respective metal ions. More specifically, the respective metal ions precipitate simultaneously as complexes at a higher pH than the precipitation pH of zirconium ion, which has the highest precipitation pH. A more uniform chemical conversion film than conventionally is thereby formed, as well as the particle size of precipitate increasing due to precipitating as a complex, a result of which higher coverage than conventionally is obtained. For this reason, corrosion resistance superior to conventionally is obtained, and particularly superior moisture resistance is obtained.

From the viewpoint of causing the effects from the above metal stabilizer to be sufficiently exhibited, the chemical conversion treatment agent of the present embodiment preferably contains all of vanadium, titanium, and zirconium.

With the chemical conversion treatment agent of the present embodiment, complexes in which the respective metal ions are complexed by the action of the metal stabilizer, and ions of the metal ions existing as is without complexization coexist.

Herein, with conventional chemical conversion treatment agents, the respective metal ions precipitate at defective parts on the surface of the aluminum-based metallic material, and then the same metal precipitates on portions of precipitated metal. For this reason, the film formation is not uniform, and defects arise in the film.

In contrast, with the chemical conversion treatment agent of the present embodiment, first, the respective metal ions not complexing precipitate in order at the precipitation pHs unique to each accompanying a rise in the pH at the interface, and cover the defective parts on the surface of the aluminum-based metallic material. Next, from the complexes formed by the action of the metal stabilizer precipitating at higher pH, a chemical conversion film is formed uniformly.

Thus, the chemical conversion treatment agent of the present embodiment greatly differs from conventional chemical conversion treatment agents in the point of the film formation step of the chemical conversion film being performed in two stages.

In addition, the aforementioned technology of Patent Document 5 is not a reaction-type chemical conversion treatment agent, but rather contains ascorbic acid, etc. in a coating-type surface treatment agent. For this reason, the technology of Patent Document 5 greatly differs from the present embodiment in the point of not exhibiting the effect characteristic to a reaction-type chemical conversion treatment agent. That is, in the technology of Patent Document 5, effects such as the uniformity of the chemical conversion film and improvement in covering by the respective metal ions simultaneously precipitating as complexes, in addition to the stability of respective metal ions and a rise in precipitation pH, derived from forming complexes with the metal stabilizer such as ascorbic acid, are not exhibited.

As the metal stabilizer used in the present embodiment, it is preferably at least one type selected from the group consisting of organic compounds having reducibility and iminodiacetic acid derivatives.

As the organic compound having reducibility, at least one type selected from the group consisting of ascorbic acid, oxalic acid, aluminum chelate, anthocyanin, polyphenol, aspartic acid, sorbitol, citric acid and sodium gluconate is preferably exemplified. These organic compounds having reducibility reduce and stabilize vanadium that easily changes the valence particularly.

As the aluminum chelate, for example, "Food Blue No. 1 aluminum chelate", "Food Red No. 2 aluminum chelate", "Food Yellow No. 4 aluminum chelate" manufactured by San-Ei Gen F.F.I., Inc. or the like can be used.

As the anthocyanin, for example, "Aruberi L" (registered trademark), "Techno Color Red ADK" and "My Thread A" manufactured by Mitsubishi-Kagaku Foods Corp. or the like can be used.

As the polyphenol, it is possible to use polyphenols such as pyrogallol, catechin and tannin, and for example, "Pancil FG-70", "Pancil FG-60" manufactured by Rilis Science Industry, or "PL-6757", "PL-4012" manufactured by GUN EI chemical Industry, or the like can be used.

In addition, as the iminodiacetic acid derivatives, iminodiacetic acid and tetrasodium iminodisuccinate are preferably exemplified.

As the tetrasodium iminodisuccinate, for example, it is possible to use "Baypure CX-100" manufactured by LANXESS, or the like.

Among the materials listed above, ascorbic acid, anthocyanin and polyphenol are preferably used from the viewpoint of corrosion resistance, moisture resistance and stability.

In the present embodiment, two or more types of metal stabilizer can be used together. More specifically, for example, two types of organic compounds having reducibility may be jointly used, one type of organic compound having reducibility and one type of iminodiacetic acid derivative may be jointly used, and two types of iminodiacetic acid derivatives may be jointly used.

In the present embodiment, the content of metal stabilizer is 5 to 5,000 ppm by mass. Herein, content of metal stabilizer in the present specification indicates the total amount thereof in the case of using two or more types of metal stabilizer. So long as the content of metal stabilizer is within this range, the effects from the aforementioned metal stabilizer are reliably exhibited. Preferably, it is 10 to 2,000 ppm by mass, and so long as within this range, the effect from the aforementioned metal stabilizer is further enhanced.

In addition, the pH of the chemical conversion treatment agent of the present embodiment mentioned above is 2 to 6, and preferably 3 to 5. So long as the pH is at least 2, a chemical conversion film can be formed without causing etching excess from the chemical conversion treatment agent, and superior corrosion resistance and moisture resistance can be obtained. In addition, so long as the pH is no higher than 6, a chemical conversion film of sufficient film amount can be formed without etching deficiency, and superior corrosion resistance and moisture resistance are obtained. The pH of the chemical conversion treatment agent can be adjusted using common acids and alkali such as sulfuric acid, nitric acid and ammonia.

The chemical conversion treatment agent of the present embodiment may contain metal ions such as of manganese, zinc, cerium, trivalent chromium, molybdenum, magnesium, strontium, calcium, tin, copper, iron and silicon compounds; phosphorus compounds such as phosphonic acid, phosphoric acid and condensed phosphoric acid; and various corrosion inhibitors such as various silane coupling agents like aminosilanes and epoxysilanes.

In addition, the chemical conversion treatment agent of the present embodiment may contain 50 to 5,000 ppm by mass of aluminum ion and contain 1 to 100 ppm by mass of free fluorine ions.

The aluminum ion elutes from the treatment target aluminum into the chemical conversion treatment agent; however, separate from this, the chemical conversion treatment reaction can be promoted by actively adding aluminum ion. In addition, by setting the free fluorine ion concentration to be higher than conventionally, it is possible to form a chemical conversion film having more superior corrosion resistance.

From the viewpoint of the above-mentioned effects being further enhanced, a more preferable content of aluminum ion is 100 to 3,000 ppm by mass, and an even more preferable content is 200 to 2,000 ppm by mass. Similarly, a more preferable content of free fluorine ion is 5 to 80 ppm by mass, and an even more preferable content is 15 to 50 ppm by mass.

As the supply source of aluminum ions, aluminate such as aluminum nitrate, aluminum sulfate, aluminum fluoride, aluminum oxide, alum, aluminum silicate, sodium aluminate, and fluoroaluminum salts such as sodium fluoroaluminate can be exemplified.

As the supply source of the free fluorine ions, hydrofluoric acid, hydrofluoric acids and salts thereof such as ammonium hydrogen fluoride, fluorozirconic acid and fluorotitanic acid; metal fluorides such as sodium fluoride, zirconium fluoride and titanium fluoride; ammonium fluoride and the like can be exemplified. In a case of using zirconium fluoride, titanium fluoride or the like as the supply source of free fluorine ions, these serve as the supply source of zirconium ion or titanium ion.

The method of chemical conversion treatment of the present embodiment is not particularly limited, and may be any method such as a spray method or dipping method. The temperature of the chemical conversion treatment agent is preferably 45 to 70° C., and more preferably 50 to 65° C. In addition, the time of chemical conversion treatment is preferably 20 to 900 seconds, and more preferably 30 to 600 seconds. By satisfying these, it is possible to form a chemical conversion film having superior corrosion resistance and moisture resistance.

With the chemical conversion film of the present embodiment formed on the surface of an aluminum heat exchanger as above, the total amount of zirconium and titanium is preferably 5 to 300 mg/m$^2$, the amount of vanadium is preferably 1 to 150 mg/m$^2$, and the amount of metal stabilizer is preferably 0.5 to 200 mg/m$^2$ in terms of carbon. By satisfying these, more superior corrosion resistance and moisture resistance is obtained. In addition, the ratio of zirconium amount to titanium amount varies according to the surface state of the aluminum heat exchanger being treated, particularly the amount of segregated matters, etc.; however, the total amount of these is sufficient so long as within the above range.

With the fins joined together so as to be at least 10 mm×10 mm, the zirconium amount, titanium amount and vanadium amount in the chemical conversion film are calculated from the measurement results of an X-ray fluorescence spectrometer "XRF-1700" (manufactured by SHIMADZU Corp.).

In addition, the metal stabilizer amount in the chemical conversion film is calculated from the measurement results of a TOC apparatus "TOC-VCS" (manufactured by SHIMADZU Corp.) as the organic carbon amount (i.e. in terms of carbon) in the chemical conversion film. However, in the case of containing the various corrosion inhibitors listed above in order to improve rust prevention, the C amount derived from metal stabilizer is calculated by deducting the C amount calculated based on the measured values of Si amount, P amount, N amount, etc. contained in the various corrosion inhibitors from the C amount measured by the above-mentioned TOC apparatus.

(b) Hydrophilization Treatment Step

The (b) hydrophilization treatment step of the present embodiment is a step of bringing the aluminum heat exchanger on which the chemical conversion film is formed on the surface in the above-mentioned (a) chemical conversion treatment step into contact with a hydrophilization treatment agent containing hydrophilic resin.

The hydrophilization treatment agent of the present embodiment is an aqueous solution or aqueous dispersion containing the hydrophilic resin in an aqueous solvent. Preferably, the hydrophilization treatment agent of the present embodiment is an aqueous solution or aqueous dispersion containing at least one among a guanidine compound represented by the below general formula (1) and a salt thereof, in addition to the hydrophilic resin.

Although the hydrophilic resin of the present embodiment is not particularly limited, it is preferably a water-soluble or water-dispersible hydrophilic resin having at least any of a hydroxyl group, carboxyl group, amide group, amino group, sulfonate group and ether group in the molecule. In addition, the hydrophilic resin of the present embodiment is preferably one that can form a hydrophilized film such that the contact angle with a water droplet is no more than 40°, from the viewpoint of favorable hydrophilicity being obtained.

As specific hydrophilic resins, polyvinyl alcohol, polyvinyl pyrrolidone, polyacrylic acid, sodium polyvinyl sulfonate, polystyrene sulfonate, polyacrylicamide, carboxymethylcellulose, chitosan, polyethylene oxide, water-soluble nylons, co-polymers of monomers forming polymers of these, acrylic polymers having polyoxyethylene chains such as 2-methoxypolyethylene glycol methacrylate/2-hydroxyethyl acrylate copolymer and the like are preferably used. These may be used independently, or two or more types may be jointly used.

The above-mentioned hydrophilic resins have superior hydrophilicity and water resistance, as well as having a characteristic of not having odor in itself and not easily adsorbing odorants. For this reason, according to the hydrophilization treatment agent containing the above-mentioned hydrophilic resins, the hydrophilized film obtained is superior in hydrophilicity and odor resistance, which do not easily deteriorate even when exposed to water drops or running water. In addition, according to this hydrophilized film, inorganic substances such as silica having a dust odor, and residual monomer component adsorbing odorant are not easily exposed; therefore, superior odor resistance is obtained.

The hydrophilic resin of the present embodiment preferably has a number average molecular weight in the range of 1,000 to 1,000,000. So long as the number average molecular weight is at least 1,000, the film properties such as hydrophilicity, odor resistance and film formability are favorable. In addition, so long as the number average molecular weight is no more than 1,000,000, the workability and film properties are favorable without the viscosity of the hydrophilization treatment agent becoming too high. A more preferable number average molecular weight is within the range of 10,000 to 200,000. The number average molecular weight and weight average molecular weight in the present specification are values in terms of standard polystyrene which was measured by the gel permeation chromatography (GPC method).

Among the above-mentioned hydrophilic resins, polyvinyl alcohols are preferable from the viewpoint of superior hydrophilicity and odor resistance, and thereamong, polyvinyl alcohols and modified polyvinyl alcohols having a degree of saponification of at least 90% are particularly preferable. By using at least one among these, superior hydrophilicity and odor resistance are obtained. A more preferable degree of saponification is at least 95%.

As the modified polyvinyl alcohol, a polyoxyalkylene-modified polyvinyl alcohol in which 0.01 to 20% among pendant groups are polyoxyalkylene ether groups represented by the below general formula (4) can be exemplified.

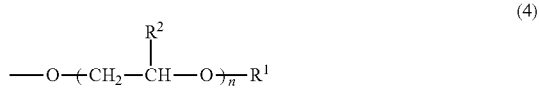

(4)

In the above formula (4), n represents an integer of 1 to 500, $R^1$ represents a hydrogen atom or an alkyl group with a carbon number of 1 to 4, and $R^2$ represents a hydrogen atom or methyl group.

In the above-mentioned polyoxyalkylene-modified polyvinyl alcohol, the polyoxyalkylene-modified group is preferably 0.1 to 5% of the pendant groups, and the degree of polymerization n of the polyoxyalkylene-modified group is preferably 3 to 30. By satisfying these, favorable hydrophilicity is obtained due to the hydrophilicity of the polyoxyalkylene-modified group. As the polyoxyalkylene-modified polyvinyl alcohol, for example, ethylene oxide-modified polyvinyl alcohol can be exemplified.

In the present embodiment, although the content of hydrophilic resin in the hydrophilization treatment agent is not particularly limited, it is preferably 10 to 99% by mass in solid content of the hydrophilization treatment agent, and more preferably 30 to 95% by mass. Favorable hydrophilicity and odor resistance are thereby obtained.

The guanidine compound preferably contained in the hydrophilization treatment agent of the present embodiment is represented by the below general formula (1). Since the guanidine compound abundantly contains nitrogen in this way, it has a characteristic of favorably adhering to the chemical conversion film containing at least one among zirconium and titanium as well as vanadium, and further has a characteristic of easily adsorbing to the aluminum surface via a thin chemical conversion film having a thickness of about 0.1 μm. For this reason, by blending a guanidine compound into the hydrophilization treatment agent, it is possible to cover the aluminum or aluminum alloy substrate with a chemical conversion film and hydrophilized film, and thus the occurrence of blackening can be suppressed. In other words, the hydrophilization treatment agent of the present embodiment can impart favorable corrosion resistance as well as being able to impart superior moisture resistance, by blending a guanidine compound.

In addition, in a preferred mode of the present embodiment, for example, a flux brazed aluminum heat exchanger is used, a two-stage anti-rust treatment is conducted by, after conducting chemical conversion treatment thereon with a chemical conversion treatment agent containing vanadium and at least one among zirconium and titanium, treating with a hydrophilization treatment agent containing a hydrophilic resin and at least one among a guanidine compound and a salt thereof, whereby sufficient anti-rust effect is imparted to the entire surface of the aluminum heat exchanger as a result, even if a state in which flux remains partially.

In addition, in a case in which the chemical conversion film contains all of zirconium, titanium and vanadium, and the hydrophilized film contains a guanidine compound, the adherence between the chemical conversion film and hydrophilized film is assumed to be particularly favorable, and an effect of remarkably improving the moisture resistance of the entire surface of the aluminum or aluminum alloy substrate, including the vicinity of flux, was found, and thus is more preferable.

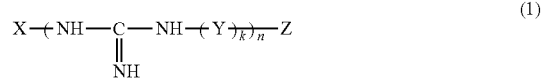

(1)

In formula (1), Y represents —C(=NH)—(CH$_2$)$_m$—, —C(=O)—NH—(CH$_2$)$_m$—, or —C(=S)—NH—(CH$_2$)$_m$—. m represents an integer of 0 to 20, n represents a positive integer, and k represents 0 or 1. X represents hydrogen, an amino group, hydroxyl group, methyl group, phenyl group, chlorophenyl group or methylphenyl group. Z represents hydrogen, an amino group, hydroxyl group, methyl group, phenyl group, chlorophenyl group, methylphenyl group, or polymer represented by the below general formula (2) and having a mass average molecular weight of 200 to 1,000,000.

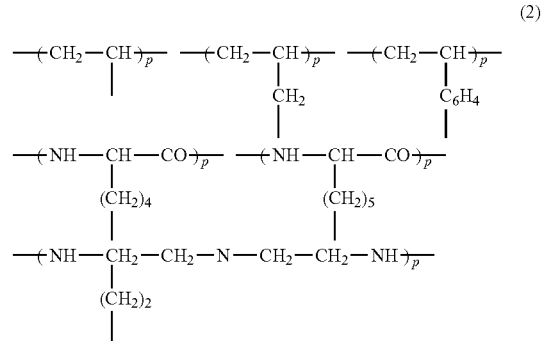

(2)

In formula (2), p represents a positive integer.

As the above-mentioned guanidine compound, for example, guanidine, aminoguanidine, guanylthiourea, 1,3-diphenyl guanidine, 1,3-di-o-tolyl guanidine, 1-o-tolyl biguanide, polyhexamethylene biguanide, polyhexaethylene biguanide, polypentamethylene biguanide, polypentaethylene biguanide, polyvinyl biguanide, polyallyl biguanide, etc. can be exemplified.

In addition, as salts of the guanidine compound, organic salts such as phosphates, hydrochlorides, sulfates, acetates and gluconates of the above-mentioned guanidine compounds can be exemplified. The total amount of salts of guanidine compounds is preferably within the range of 0.01 to 100 by mole ratio relative to the total amount of guanidine compounds and salts thereof. Favorable corrosion resistance and moisture resistance are thereby obtained.

The above-mentioned guanidine compounds and salts thereof preferably have a number average molecular weight within the range of 59 to 1,000,000. As shown in the above general formula (1), so long as the lowest of the molecular weights of the guanidine compounds is 59, and the number average molecular weight is no more than 1,000,000, water solubilization is be possible, and so long as within this range, favorable corrosion resistance and moisture resistance are obtained. From the viewpoint of these effects being further enhanced, the lower limit for the number average molecular weight is more preferably 300, and even more preferably 500. On the other hand, the upper limit is more preferably 100,000, and even more preferably 20,000.

As the above-mentioned guanidine compounds and salts thereof, since an effect of superior corrosion resistance and moisture resistance being obtained, among the guanidine compounds and salts thereof represented by the above general formulas (1) and (2), they are preferably guanidine compounds and salts thereof having a biguanide structure presented by the below general formula (3) in the molecule.

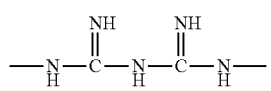
(3)

As the guanidine compounds and salts thereof having the above-mentioned biguanide structure, for example, polyhexamethylene biguanide, 1-o-tolyl biguanide, chlorhexidine gluconate, salts thereof, etc. can be exemplified. These may be used independently, or two or more types may be jointly used.

The total of the contents of the above-mentioned guanidine compounds and salts thereof is preferably 1 to 40% by mass relative to the solid content of the hydrophilization treatment agent. Superior corrosion resistance and moisture resistance are thereby obtained. In addition, from the viewpoint of these effects being further enhanced, it is more preferably 5 to 30% by mass.

The hydrophilization treatment agent of the present embodiment preferably further contains at least one selected from the group consisting of phosphoric acid, condensed phosphoric acid, phosphonic acid, derivatives thereof and lithium ion.

By the hydrophilization treatment agent of the present embodiment containing phosphorus-based compounds such as phosphoric acid, condensed phosphoric acid, phosphonic acid and derivatives thereof, a hydrophilized film containing these phosphorus-based compounds are formed on the aluminum surface. Even in a case of aluminum eluting from the aluminum surface, it is thereby possible to suppress further elution of aluminum over a long time period, by the eluted aluminum reacting with phosphorus-based compounds in the hydrophilized film to form aluminum phosphate to insolubilize, and thus superior corrosion resistance and moisture resistance are obtained.

As the above-mentioned phosphorus-based compounds, for example, phosphoric acid, polyphosphoric acid, tripolyphosphoric acid, metaphosphoric acid, ultraphosphoric acid, phytic acid, phosphonic acid, hydroxylethylidene diphosphonic acid, nitrilotris(methylene phosphonic acid), phosphonobutane tricarboxylic acid (hereinafter referred to as "PBTC"), ethylenediaminotetra(methylene phosphonic acid), tetrakis(hydroxymethyl)phosphoium salt, acrylphosphonic copolymers, etc. can be exemplified. These may be used independently, or two or more types may be jointly used.

The content of phosphorus-based compounds is preferably 0.05 to 25% by mass relative to solid content of the hydrophilization treatment agent. Superior corrosion resistance and moisture resistance are thereby obtained. In addition, from the viewpoint of these effects being further enhanced, it is more preferably 0.1 to 10% by mass.

In addition, by the hydrophilization treatment agent of the present embodiment containing lithium ion, superior corrosion resistance and moisture resistance are obtained by the following such mechanism.

In other words, particularly in the case of using a flux brazed aluminum heat exchanger, a hardly-soluble film is formed at the interface between the flux residue and hydrophilized film, by the alkali metal ions such as potassium ion in the halogen-based flux remaining on the surface of the aluminum heat exchanger and lithium ion from the hydrophilized film carrying out the ion-exchange reaction shown in the below formula (5). As a result of the hardly-soluble film formed thereby suppressing elution of aluminum from the aluminum surface, superior corrosion resistance and moisture resistance are obtained. Since lithium ion remains in the hydrophilized film over a long time period, the above-mentioned effects are maintained over a long time period.

$$K_xAlF_y + xLi \rightarrow Li_xAlF_y + xK \quad (5)$$

In the above formula (5), combinations of x and y are x of 1 and y of 4, x of 2 and y of 5, or x of 3 and y of 6.

As the supply source of the above-mentioned lithium ion, it is not particularly limited so long as being a lithium compound that can generate lithium ion in the hydrophilization treatment agent and. For example, lithium hydroxide, lithium sulfate, lithium carbonate, lithium nitrate, lithium acetate, lithium citrate, lithium lactate, lithium phosphate, lithium oxalate, lithium silicate, lithium metasilicate, etc. can be exemplified. Thereamong, from the viewpoint of having little influence on odor, lithium hydroxide, lithium sulfate and lithium carbonate are preferable. These may be used independently, or two or more types may be jointly used.

The content of lithium ion is preferably 0.01 to 25% by mass in metal conversion relative to solid content of the hydrophilization treatment agent. Superior corrosion resistance and moisture resistance are thereby obtained. In addition, from the viewpoint of these effects being further enhanced, it is more preferably 0.05 to 5% by mass.

From the viewpoint of raising the water resistance of the hydrophilized film, the hydrophilization treatment agent of the present embodiment may contain a cross-linker as necessary. As the cross-linker, an inorganic cross-linker or organic cross-linker that reacts with the hydroxyl group of polyvinyl alcohol or modified polyvinyl alcohol can be used.

As inorganic cross-linkers, silica compounds such as silicon dioxide, zirconium compounds such as ammonium fluorozirconate and ammonium zirconium carbonate, metal chelate compounds such as titanium chelate, metal salts of Ca, Al, Mg, Fe, Zn and the like, etc. can be exemplified. In addition to an improvement in water resistance, these inorganic cross-linkers also have an effect of causing the contact angle with water to decrease by forming microscopic irregularities in the surface of the hydrophilized film.

As organic cross-linkers, melamine resins, phenol resins, epoxy compounds, blocked-isocyanate compounds, oxazoline compounds, carbodiimide compounds, etc. can be exemplified. These may be used independently, or two or more types may be jointly used.

The content of these cross-linkers is preferably 0.1 to 50% by mass relative to solid content of the hydrophilization treatment agent. Superior water resistance is thereby obtained. In addition, from the viewpoint of these effects being further enhanced, it is more preferably 0.5 to 30% by mass.

The hydrophilization treatment agent of the present embodiment may contain, as optional components, dispersants, corrosion inhibitors, pigments, silane-coupling agents, antimicrobial agents (antiseptics), lubricants, deodorants, etc.

Not particularly limited as the dispersants, various surfactants and dispersion resins can be exemplified.

Not particularly limited as corrosion inhibitors, tannic acid, imidazole compounds, triazine compounds, triazole compounds, hydrazine compounds, zirconium compounds, etc. can be exemplified. Thereamong, zirconium compounds are preferable from the viewpoint of superior corrosion resistance and moisture resistance being obtained. Not particularly limited as the zirconium compounds, for example, soluble fluorozirconates such as alkali metal fluorozirconates such as $K_2ZrF_6$; and fluorozirconates such as $(NH_4)_2ZrF_6$, fluorozirconic acids such as $H_2ZrF_6$, fluorozirconium, zirconium oxide, etc. can be exemplified.

Not limited as pigments, for example, various colored pigments such as organic pigments, etc. can be exemplified, in addition to inorganic pigments such as titanium oxide, zinc oxide, zirconium oxide, calcium carbonate, barium sulfate, alumina, kaolin clay, carbon black, iron oxides ($Fe_2O_3$, $Fe_3O_4$, etc.).

The silane-coupling agent raises the compatibility of the above-mentioned pigments with the hydrophilic resin, and can improve the adherence of the two. Not particularly limited as silane-coupling agents, for example, γ-aminopropyltrimethoxysilane, γ-aminopropyltriethoxysilane, γ-glycidoxypropyltrimethoxysilane, γ-methacryloxypropyltriethoxysilane, N-(2-(vinylbenzylamino)ethyl)-3-aminopropyltrimethoxysilane, etc. can be exemplified. The silane-coupling agent may be a condensate or polymer.

Not particularly limited as antimicrobial agents (antiseptics), for example, 2-(4-thiazolyl)benzimidazole, zinc pyrithione, benzisothiazoline, etc. can be exemplified.

The contents of the above-mentioned optional components are preferably in total 0.01 to 50% by mass relative to solid content of the hydrophilization treatment agent. The respective effects are thereby exhibited without inhibiting the effect of the hydrophilization treatment agent. From the viewpoint of the respective effects being further enhanced, it is more preferably 0.1 to 30% by mass.

Although not particularly limited as solvents of the hydrophilization treatment agent, water-based solvents with water as a main constituent are preferable from the viewpoint of fluid waste disposal, etc. In addition, from the viewpoint of improving the film formability and being able to form a more uniform, smooth film, an organic solvent may be jointly used. As the organic solvent, it is not particularly limited so long as one generally used in paints, etc. and uniformly mixing with water, and for example, alcohol-based, ketone-based, ester-based and ether-based organic solvents can be exemplified. The content of these organic solvents is preferably 0.01 to 5% by mass in the hydrophilization treatment agent.

In addition, the hydrophilization treatment agent of the present embodiment may contain a pH adjuster from the viewpoint of a stability improvement. As the pH adjuster, common acids and alkali such as sulfuric acid, nitric acid and ammonia can be exemplified.

The hydrophilization treatment agent of the present embodiment preferably has a solid content concentration of 1 to 11% by mass, and more preferably 2 to 5% by mass, from the viewpoints of workability, uniformity and thickness of formed hydrophilized film, cost savings, etc.

In (b) the hydrophilization treatment step of the present embodiment, it is preferable to perform water washing treatment by a conventional, known method on the aluminum heat exchanger subjected to chemical conversion treatment in (a) the chemical conversion treatment step, before the hydrophilization treatment.

In the addition, as the method of bringing the hydrophilization treatment agent including the aforementioned constitution into contact with the aluminum heat exchanger on which the chemical conversion film is formed on the surface, a dipping method, spray method, coating method, etc. can be exemplified, and thereamong, the dipping method is preferable when considering the complicated structure of the aluminum heat exchanger. The dipping time is preferably set to on the order of 10 seconds at room temperature, normally. After dipping, the hydrophilized film amount can be controlled by adjusting the wet film amount with air blowing.

(c) Baking Step

The (c) baking step of the present embodiment is a step of baking treating the aluminum heat exchanger subjected to hydrophilization treatment in the aforementioned (b) hydrophilization treatment step, thereby forming a hydrophilized film on the surface thereof.

The baking temperature is preferably a baking temperature at which the temperature of the aluminum heat exchanger itself becomes 140 to 160°, and the baking time is preferably 2 to 120 minutes. It is thereby possible to reliably form a hydrophilized film.

The film amount of the hydrophilized film formed in (c) the baking step of the present embodiment is preferably 0.05 to 5 $g/m^2$. So long as the film amount of the hydrophilized film is within this range, superior corrosion resistance and moisture resistance are obtained, as well as superior water resistance and odor resistance being obtained. The film amount of the hydrophilized film can be calculated from the measurement results of the TOC apparatus "TOC-VCS" (manufactured by SHIMADZU Corp.), using a conversion factor calculated from the relationship between the hydrophilized film amount of a standard film sample and an organic carbon amount contained therein.

The present invention is not to be limited to the above-mentioned embodiments, and modifications, improvements, etc. with a scope that can achieve the objects of the present invention are included in the present invention.

EXAMPLES

Next, the present invention will be explained in further detail based on examples; however, the present invention is not to be limited thereto. Parts, % and ppm are all mass based unless otherwise specified.

Examples 1 to 38 and Comparative Examples 1 to 6

Preparation of Chemical Conversion Treatment Agent

Following a preparation method known heretofore, chemical conversion treatment agents were prepared by formulating and mixing the respective components so that the contents of zirconium, titanium, vanadium and metal stabilizer as well as pH become as shown in Table 1 to Table 3. Fluorozirconic acid was used as the zirconium supply source, fluorotitanic acid was used as the titanium supply source, and vanadyl sulfate was used as the vanadium supply source. The respective concentrations in Table 1 to Table 3 are calculated from the formulation.

Preparation of Hydrophilization Treatment Agent

Following a preparation method known heretofore, hydrophilization treatment agents with a solid content concentration of 2.5% were prepared by formulating and mixing the respective components so that the contents of hydrophilic resin, guanidine compound represented by the above general formula (1), phosphorus-based compound, lithium ion and additives become as shown in Table 1 to Table 3, and using water as the solvent. However, in Example 13 only, a hydrophilization treatment agent with a solid content concentration of 5% was prepared.

Manufacture of Test Heat Exchanger

In Examples 1 to 33 and Comparative Examples 1 to 6, an aluminum heat exchanger (NB heat exchanger) for automobile air-conditioning brazed with $KAlF_4$ and $K_3AlF_6$ flux by the Nocolok brazing process was used as the heat exchanger. In addition, in Examples 34 to 38, an aluminum heat exchanger (VB heat exchanger) for automobile air-conditioning brazed by way of a vacuum brazing method was used. The flux amount on the fin surface of the NB heat exchanger was 50 mg/m$^2$ as potassium.

These heat exchangers were acid washed by dipping for 20 seconds in an acid bath containing 1% sulfuric acid and 0.4% $KAlF_4$ and $K_3AlF_6$ flux at 40° C.

After acid washing, the heat exchangers were subjected to chemical conversion treatment by dipping for 60 seconds in the chemical conversion treatment agent prepared as mentioned above at 50° C.

After chemical conversion treatment, the heat exchangers were washed with water for 30 second, followed by dipping for 10 seconds in the hydrophilization treatment agent prepared as mentioned above at room temperature. After dipping, the wet film amount was adjusted by way of air blowing.

Next, baking treatment was conducted in a drying oven for 5 minutes at a baking temperature at which the temperature of the heat exchanger itself became 150° C., thereby manufacturing the test heat exchangers.

Evaluation

For the test heat exchangers manufactured in each of the Examples and Comparative Examples, the physical property evaluations shown below were performed.

Corrosion Resistance (White Rust Resistance)

For the test heat exchangers manufactured in each of the Examples and Comparative Examples, evaluation of corrosion resistance (white rust resistance) based on JIS Z 2371 was conducted. More specifically, a 5% saline solution was sprayed at 35° C. onto the test heat exchangers manufactured in each of the Examples and Comparative Examples, followed by visually evaluating an area of white rust occurrence after the elapse of 2,000 hours in accordance with the evaluation criteria described below. Two people served as evaluators, and corrosion resistance was evaluated based on the average value of the evaluations of the two people.

(Evaluation Criteria)

10: No white rust generation
9: White rust observed, but area of white rust generation less than 10%
8: Area of white rust generation at least 10% to less than 20%
7: Area of white rust generation at least 20% to less than 30%
6: Area of white rust generation at least 30% to less than 40%
5: Area of white rust generation at least 40% to less than 50%
4: Area of white rust generation at least 50% to less than 60%
3: Area of white rust generation at least 60% to less than 70%
2: Area of white rust generation at least 70% to less than 80%
1: Area of white rust generation at least 80% to less than 90%

Moisture Resistance (Blackening Resistance)

For the test heat exchangers manufactured in each of the Examples and Comparative Examples, a moisture resistance test of 3,000 hours was conducted under an environment at a temperature of 70° C. and humidity of at least 98%. The area of blackening occurrence after the test was visually evaluated based on the evaluation criteria described below. Two people served as evaluators, and moisture resistance was evaluated based on the average value of the evaluations of the two people.

Hydrophilicity

The contact angles with water droplets were measured after bringing the test heat exchangers manufactured in each of the Examples and Comparative Examples into contact with running water for 72 hours. The measurement of contact angle was conducted using an automatic contact angle meter "CA-Z" (manufactured by Kyowa Interface Science Co., LTD.). The hydrophilicity is higher as the contact angle decreases, and the hydrophilicity is evaluated as favorable so long as the contact angle is no more than 40°.

Odor

After bringing the test heat exchangers manufactured in each of the Examples and Comparative Examples into contact with running tap water for 72 hours, the odor thereof was evaluated by the evaluation criteria described below. Two people served as evaluators, and odor was evaluated based on the average value of the evaluations of the two people. The odor resistance was evaluated as favorable so long as the odor was no more than 1.5.

(Evaluation Criteria)

0: No odor
1: Slight odor sensed
2: Odor easily sensed
3: Odor distinctly sensed
4: Strong odor sensed
5: Very strong odor sensed Film Amount With the fins joined together so as to be at least 10 mm×10 mm, the zirconium amount, titanium amount and vanadium amount in the chemical conversion film formed on the surface of the test heat exchangers manufactured in each of the Examples and Comparative Examples were calculated from the measurement results of an X-ray fluorescence spectrometer "XRF-1700" (manufactured by SHIMADZU Corp.).

In addition, the metal stabilizer amount in the chemical conversion film was calculated from the measurement results of a TOC apparatus "TOC-VCS" (manufactured by SHIMADZU Corp.) as the organic carbon amount in the chemical conversion film (i.e. in terms of carbon).

The film amount of the hydrophilized film formed on the surface of the test heat exchangers manufactured in each of the Examples and Comparative Examples was calculated from the measurement results of the TOC apparatus "TOC-VCS" (manufactured by SHIMADZU Corp.), using a conversion factor calculated from the relationship between the hydrophilized film amount of a standard film sample and an organic carbon amount contained therein.

The compositions of the chemical conversion treatment agents and hydrophilization treatment agents prepared in each of the Examples and Comparative Examples and the evaluations results of the test heat exchangers manufactured in each of the Examples and Comparative Examples are collectively shown in Table 1 to Table 3.

TABLE 1

| | | | | Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| Chemical conversion treatment agent | Zr | | Concentration: ppm | 30 | — | 5 | 5 | 3000 | — | 1000 | 2000 | 1000 | 100 |
| | Ti | | Concentration: ppm | — | 10 | 5 | 5 | — | 500 | 150 | 500 | 10 | 50 |
| | V | | Concentration: ppm | 100 | 100 | 100 | 100 | 50 | 10 | 500 | 500 | 300 | 100 |
| | Metal stabilizer | Ascorbic acid | Concentration: ppm | 100 | — | — | 50 | — | — | — | — | — | 500 |
| | | Oxalic acid | Concentration: ppm | — | 100 | — | — | — | — | — | — | — | — |
| | | Aruberi L | Concentration: ppm | — | — | 100 | 50 | — | — | — | — | — | — |
| | | Pyrogallol | Concentration: ppm | — | — | — | — | 100 | — | — | — | — | — |
| | | Pancil FG-70 | Concentration: ppm | — | — | — | — | — | 100 | — | — | — | — |
| | | PL-6757 | Concentration: ppm | — | — | — | — | — | — | 100 | — | — | — |
| | | Iminodiacetic acid | Concentration: ppm | — | — | — | — | — | — | — | 100 | — | — |
| | | Baypure CX-100 | Concentration: ppm | — | — | — | — | — | — | — | — | 100 | — |
| | pH | | | 3.5 | 3.5 | 3.5 | 3.5 | 3.5 | 3.5 | 3.5 | 3.5 | 3.5 | 3.5 |
| Hydrophilization treatment agent | Hydrophilic resin | Polyvinyl alcohol | Solid content % | 50 | 50 | 50 | 50 | 50 | 50 | 50 | 50 | 50 | 50 |
| | | Ethylene oxide-modified polyvinyl alcohol | Solid content % | 20 | 20 | 20 | 20 | 20 | 20 | 20 | 20 | 20 | 20 |
| | | Carboxymethylcellulose | Solid content % | — | — | — | — | — | — | — | — | — | — |
| | | Sodium polyvinyl sulfonate | Solid content % | — | — | — | — | — | — | — | — | — | — |
| | | Polyacrylic acid | Solid content % | — | — | — | — | — | — | — | — | — | — |
| | | Chitosan | Solid content % | — | — | — | — | — | — | — | — | — | — |
| | Guanidine compound | 1-o-tolyl biguanide | Solid content % | — | — | — | — | — | — | — | — | — | — |
| | | Polyhexamethylene biguanide | Solid content % | 10 | 10 | 10 | 10 | 10 | 10 | 10 | 10 | 10 | 10 |
| | Phosphorus-based compound | Phosphoric acid | Solid content % | — | — | — | — | — | — | — | — | — | — |
| | | Condensed phosphoric acid | Solid content % | — | — | — | — | — | — | — | — | — | — |
| | | Phytic acid | Solid content % | — | — | — | — | — | — | — | — | — | — |
| | | PBTC | Solid content % | — | — | — | — | — | — | — | — | — | — |
| | Lithium | Lithium hydroxide | Solid content % | — | — | — | — | — | — | — | — | — | — |
| | Additives | Silica | Solid content % | 20 | 20 | 20 | 20 | 20 | 20 | 20 | 20 | 20 | 20 |
| | | Phenol resin | Solid content % | — | — | — | — | — | — | — | — | — | — |
| | | Citric acid | Solid content % | — | — | — | — | — | — | — | — | — | — |
| Film amount | Chemical conversion film | Zr | mg/m$^2$ | 9 | — | 3 | 3 | 80 | — | 57 | 71 | 37 | 4 |
| | | Ti | mg/m$^2$ | — | 10 | 9 | 8 | — | 101 | 39 | 103 | 7 | 20 |
| | | V | mg/m$^2$ | 10 | 18 | 14 | 15 | 7 | 10 | 48 | 50 | 16 | 16 |
| | | C(metal stabilizer) | mg/m$^2$ | 5 | 4 | 6 | 6 | 7 | 5 | 5 | 3 | 7 | 15 |
| | Hydrophilized film | | g/m$^2$ | 0.2 | 0.2 | 0.2 | 0.2 | 0.2 | 0.2 | 0.2 | 0.2 | 0.2 | 0.2 |
| Heat exchanger Evaluation results | | | | NB | NB | NB | NB | NB | NB | NB | NB | NB | NB |
| | Corrosion resistance (2000 h) | | | 7.0 | 7.5 | 8.5 | 9.0 | 8.0 | 8.5 | 9.5 | 9.5 | 9.0 | 9.0 |
| | Moisture resistance (70° C. 98% RH3000 h) | | | 7.5 | 7.0 | 7.5 | 8.0 | 7.0 | 7.0 | 8.0 | 8.5 | 9.5 | 9.0 |
| | Hydrophilicity | | | 20 | 20 | 20 | 20 | 20 | 20 | 20 | 20 | 20 | 20 |
| | Odor | | | 1.0 | 1.0 | 1.0 | 1.0 | 1.0 | 1.0 | 1.0 | 1.0 | 1.0 | 1.0 |

| | | | | Example | | | | | | | | |
|---|---|---|---|---|---|---|---|---|---|---|---|---|
| | | | | 11 | 12 | 13 | 14 | 15 | 16 | 17 | 18 | 19 |
| Chemical conversion treatment agent | Zr | | Concentration: ppm | 500 | 500 | 500 | 500 | 500 | 500 | 500 | 500 | 500 |
| | Ti | | Concentration: ppm | 50 | 50 | 50 | 50 | 50 | 50 | 50 | 50 | 50 |
| | V | | Concentration: ppm | 100 | 100 | 100 | 100 | 100 | 100 | 100 | 100 | 100 |
| | Metal stabilizer | Ascorbic acid | Concentration: ppm | 500 | 500 | 500 | 500 | 500 | 500 | 10 | 2000 | 500 |
| | | Oxalic acid | Concentration: ppm | — | — | — | — | — | — | — | — | — |
| | | Aruberi L | Concentration: ppm | — | — | — | — | — | — | — | — | — |
| | | Pyrogallol | Concentration: ppm | — | — | — | — | — | — | — | — | — |
| | | Pancil FG-70 | Concentration: ppm | — | — | — | — | — | — | — | — | — |
| | | PL-6757 | Concentration: ppm | — | — | — | — | — | — | — | — | — |
| | | Iminodiacetic acid | Concentration: ppm | — | — | — | — | — | — | — | — | — |

TABLE 1-continued

| | | | | | | | | | | | | |
|---|---|---|---|---|---|---|---|---|---|---|---|---|
| | | Baypure CX-100 | Concentration: ppm | — | — | — | — | — | — | — | — | — |
| | pH | | | 3.5 | 3.5 | 3.5 | 3 | 3.5 | 5 | 3.5 | 3.5 | 3.5 |
| Hydro-philization treatment agent | Hydro-philic resin | Polyvinyl alcohol | Solid content % | 50 | 50 | 50 | 40 | 40 | 40 | 40 | 40 | 45 |
| | | Ethylene oxide-modified polyvinyl alcohol | Solid content % | 20 | 20 | 20 | 20 | 20 | 20 | 20 | 20 | 20 |
| | | Carboxymethylcellulose | Solid content % | — | — | — | — | — | — | — | — | — |
| | | Sodium polyvinyl sulfonate | Solid content % | — | — | — | — | — | — | — | — | — |
| | | Polyacrylic acid | Solid content % | — | — | — | — | — | — | — | — | — |
| | | Chitosan | Solid content % | — | — | — | — | — | — | — | — | — |
| | Guanidine compound | 1-o-tolyl biguanide | Solid content % | — | — | — | — | — | — | — | — | — |
| | | Polyhexamethylene biguanide | Solid content % | 10 | 10 | 10 | 20 | 20 | 20 | 20 | 20 | 10 |
| | Phosphorus-based compound | Phosphoric acid | Solid content % | — | — | — | — | — | — | — | — | 5 |
| | | Condensed phosphoric acid | Solid content % | — | — | — | — | — | — | — | — | — |
| | | Phytic acid | Solid content % | — | — | — | — | — | — | — | — | — |
| | | PBTC | Solid content % | — | — | — | — | — | — | — | — | — |
| | Lithium | Lithium hydroxide | Solid content % | — | — | — | — | — | — | — | — | — |
| | Additives | Silica | Solid content % | 20 | 20 | 20 | 20 | 20 | 20 | 20 | 20 | 20 |
| | | Phenol resin | Solid content % | — | — | — | — | — | — | — | — | — |
| | | Citric acid | Solid content % | — | — | — | — | — | — | — | — | — |
| Film amount | Chemical conversion film | Zr | mg/m$^2$ | 23 | 23 | 23 | 25 | 22 | 20 | 32 | 14 | 22 |
| | | Ti | mg/m$^2$ | 16 | 16 | 16 | 19 | 17 | 13 | 27 | 8 | 17 |
| | | V | mg/m$^2$ | 14 | 14 | 14 | 15 | 15 | 10 | 25 | 6 | 14 |
| | | C(metal stabilizer) | mg/m$^2$ | 12 | 16 | 13 | 19 | 16 | 11 | 1 | 32 | 13 |
| | Hydrophilized film | | g/m$^2$ | 0.1 | 0.2 | 2 | 0.2 | 0.2 | 0.2 | 0.2 | 0.2 | 0.2 |
| Heat exchanger Evaluation results | | | | NB | NB | NB | NB | NB | NB | NB | NB | NB |
| | | Corrosion resistance (2000 h) | | 9.0 | 9.0 | 9.0 | 9.5 | 9.5 | 8.5 | 9.5 | 8.5 | 9.5 |
| | | Moisture resistance (70° C. 98% RH3000 h) | | 8.5 | 9.0 | 8.5 | 8.5 | 9.5 | 9.0 | 8.5 | 9.5 | 9.0 |
| | | Hydrophilicity | | 20 | 20 | 20 | 22 | 22 | 22 | 22 | 22 | 20 |
| | | Odor | | 1.0 | 1.0 | 1.0 | 1.5 | 1.5 | 1.5 | 1.5 | 1.5 | 1.0 |

TABLE 2

| | | | | Example | | | | | | | | | |
|---|---|---|---|---|---|---|---|---|---|---|---|---|---|
| | | | | 20 | 21 | 22 | 23 | 24 | 25 | 26 | 27 | 28 | 29 |
| Chemical conversion treatment agent | Zr | | Concentration: ppm | 500 | 500 | 500 | 500 | 500 | 500 | 500 | 500 | 500 | 500 |
| | Ti | | Concentration: ppm | 50 | 50 | 50 | 50 | 50 | 50 | 50 | 50 | 50 | 50 |
| | V | | Concentration: ppm | 100 | 100 | 100 | 100 | 100 | 100 | 100 | 100 | 100 | 100 |
| | Metal stabilizer | Ascorbic acid | Concentration: ppm | 500 | 500 | 500 | 500 | 500 | 500 | 500 | 500 | 500 | 500 |
| | | Oxalic acid | Concentration: ppm | — | — | — | — | — | — | — | — | — | — |
| | | Aruberi L | Concentration: ppm | — | — | — | — | — | — | — | — | — | — |
| | | Pyrogallol | Concentration: ppm | — | — | — | — | — | — | — | — | — | — |
| | | Pancil FG-70 | Concentration: ppm | — | — | — | — | — | — | — | — | — | — |
| | | PL-6757 | Concentration: ppm | — | — | — | — | — | — | — | — | — | — |
| | | Iminodiacetic acid | Concentration: ppm | — | — | — | — | — | — | — | — | — | — |
| | | Baypure CX-100 | Concentration: ppm | — | — | — | — | — | — | — | — | — | — |
| | pH | | | 3.5 | 3.5 | 3.5 | 3.5 | 3.5 | 3.5 | 3.5 | 3.5 | 3.5 | 3.5 |
| Hydro-philization treatment agent | Hydro-philic resin | Polyvinyl alcohol | Solid content % | 45 | 45 | 45 | 49 | — | 50 | 40 | — | 70 | 70 |
| | | Ethylene oxide-modified polyvinyl alcohol | Solid content % | 20 | 20 | 20 | 20 | — | — | 20 | — | — | 20 |
| | | Carboxymethylcellulose | Solid content % | — | — | — | — | 60 | — | — | — | — | — |
| | | Sodium polyvinyl sulfonate | Solid content % | — | — | — | — | — | 20 | — | — | — | — |
| | | Polyacrylic acid | Solid content % | — | — | — | — | 30 | — | 10 | — | — | — |
| | | Chitosan | Solid content % | — | — | — | — | — | — | — | 60 | — | — |
| | Guanidine compound | 1-o-tolyl biguanide | Solid content % | — | — | — | — | — | 5 | — | 10 | — | — |
| | | Polyhexamethylene biguanide | Solid content % | 10 | 10 | 10 | 10 | — | 10 | — | 10 | — | 10 |
| | Phosphorus-based compound | Phosphoric acid | Solid content % | — | — | — | — | — | — | — | — | — | — |
| | | Condensed phosphoric acid | Solid content % | 5 | — | — | — | — | — | — | — | — | — |
| | | Phytic acid | Solid content % | — | 5 | — | — | — | — | — | — | — | — |
| | | PBTC | Solid content % | — | — | 5 | — | — | — | — | — | — | — |
| | Lithium | Lithium hydroxide | Solid content % | — | — | — | 1 | — | — | — | — | — | — |
| | Additives | Silica | Solid content % | 20 | 20 | 20 | 20 | — | 20 | 20 | 20 | 30 | — |
| | | Phenol resin | Solid content % | — | — | — | — | 5 | — | — | — | — | — |
| | | Citric acid | Solid contents | — | — | — | — | — | — | — | 10 | — | — |

TABLE 2-continued

| | | | | | | | | | | | | | |
|---|---|---|---|---|---|---|---|---|---|---|---|---|---|
| Film amount | Chemical conversion film | Zr | mg/m² | 21 | 23 | 22 | 23 | 22 | 21 | 22 | 23 | 22 | 21 |
| | | Ti | mg/m² | 16 | 15 | 15 | 14 | 15 | 15 | 17 | 15 | 14 | 17 |
| | | V | mg/m² | 13 | 14 | 15 | 11 | 13 | 14 | 15 | 15 | 14 | 15 |
| | | C(metal stabilizer) | mg/m² | 15 | 12 | 16 | 17 | 15 | 14 | 12 | 16 | 16 | 14 |
| | Hydrophilized film | | g/m² | 0.2 | 0.2 | 0.2 | 0.2 | 0.2 | 0.2 | 0.2 | 0.2 | 0.2 | 0.2 |
| Heat exchanger Evaluation results | | | | NB | NB | NB | NB | NB | NB | NB | NB | NB | NB |
| | Corrosion resistance (2000 h) | | | 9.5 | 9.5 | 9.5 | 9.5 | 9.0 | 9.0 | 9.0 | 9.0 | 9.0 | 9.0 |
| | Moisture resistance (70° C. 98% RH3000 h) | | | 9.0 | 9.0 | 9.0 | 8.5 | 7.5 | 8.5 | 7.5 | 8.5 | 7.5 | 7.5 |
| | Hydrophilicity | | | 20 | 20 | 20 | 20 | 22 | 21 | 20 | 20 | 20 | 20 |
| | Odor | | | 1.0 | 1.0 | 1.0 | 1.0 | 1.5 | 1.5 | 1.0 | 1.5 | 1.5 | 1.5 |

| | | | | Example | | | | | | | | | |
|---|---|---|---|---|---|---|---|---|---|---|---|---|---|
| | | | | | 30 | 31 | 32 | 33 | 34 | 35 | 36 | 37 | 38 |
| Chemical conversion treatment agent | | Zr | Concentration: ppm | | 500 | 500 | 500 | 500 | 500 | 100 | 500 | 500 | 500 |
| | | Ti | Concentration: ppm | | 50 | 50 | 50 | 50 | 50 | — | 50 | 50 | 50 |
| | | V | Concentration: ppm | | 100 | 100 | 100 | 100 | 100 | 100 | 100 | 100 | 100 |
| | Metal stabilizer | Ascorbic acid | Concentration: ppm | | 500 | 500 | 500 | 500 | 100 | 100 | — | — | — |
| | | Oxalic acid | Concentration: ppm | | — | — | — | — | — | — | — | — | — |
| | | Aruberi L | Concentration: ppm | | — | — | — | — | — | — | 100 | — | — |
| | | Pyrogallol | Concentration: ppm | | — | — | — | — | — | — | — | — | — |
| | | Pancil FG-70 | Concentration: ppm | | — | — | — | — | — | — | — | — | — |
| | | PL-6757 | Concentration: ppm | | — | — | — | — | — | — | — | — | — |
| | | Iminodiacetic acid | Concentration: ppm | | — | — | — | — | — | — | — | 100 | — |
| | | Baypure CX-100 | Concentration: ppm | | — | — | — | — | — | — | — | — | 100 |
| | pH | | | | 3.5 | 3.5 | 3.5 | 3.5 | 3.5 | 3.5 | 3.5 | 3.5 | 3.5 |
| Hydrophilization treatment agent | Hydrophilic resin | Polyvinyl alcohol | Solid content % | | — | 60 | 55 | — | 50 | 50 | 45 | 49 | — |
| | | Ethylene oxide-modified polyvinyl alcohol | Solid content % | | — | — | 20 | — | 20 | 20 | 20 | 20 | — |
| | | Carboxymethylcellulose | Solid content % | | 60 | — | — | — | — | — | — | — | 70 |
| | | Sodium polyvinyl sulfonate | Solid content % | | — | 30 | — | — | — | — | — | — | — |
| | | Polyacrylic acid | Solid content % | | 20 | — | 20 | — | — | — | — | — | 20 |
| | | Chitosan | Solid content % | | — | — | — | 70 | — | — | — | — | — |
| | Guanidine compound | 1-o-tolyl biguanide | Solid content % | | — | — | — | — | — | — | — | — | — |
| | | Polyhexamethylene biguanide | Solid content % | | — | — | — | — | 10 | 10 | 10 | 10 | — |
| | Phosphorus-based compound | Phosphoric acid | Solid content % | | — | — | 5 | — | — | — | — | — | — |
| | | Condensed phosphoric acid | Solid content % | | — | — | — | — | — | — | — | 5 | — |
| | | Phytic acid | Solid content % | | — | — | — | — | — | — | — | — | — |
| | | PBTC | Solid content % | | — | — | — | — | — | — | — | — | — |
| | Lithium | Lithium hydroxide | Solid content % | | — | — | — | — | — | — | — | 1 | — |
| | Additives | Silica | Solid content % | | 20 | — | — | 20 | 20 | 20 | 20 | 20 | — |
| | | Phenol resin | Solid content % | | — | 10 | — | — | — | — | — | — | 10 |
| | | Citric acid | Solid contents | | — | — | — | 10 | — | — | — | — | — |
| Film amount | Chemical conversion film | Zr | mg/m² | | 23 | 23 | 21 | 22 | 29 | 15 | 25 | 27 | 27 |
| | | Ti | mg/m² | | 15 | 17 | 16 | 15 | 11 | — | 10 | 13 | 11 |
| | | V | mg/m² | | 13 | 15 | 14 | 14 | 18 | 9 | 15 | 16 | 14 |
| | | C(metal stabilizer) | mg/m² | | 15 | 13 | 16 | 14 | 17 | 5 | 13 | 11 | 10 |
| | Hydrophilized film | | g/m² | | 0.2 | 0.2 | 0.2 | 0.2 | 0.2 | 0.2 | 0.2 | 0.2 | 0.2 |
| Heat exchanger Evaluation results | | | | | NB | NB | NB | NB | VB | VB | VB | VB | VB |
| | Corrosion resistance (2000 h) | | | | 9.0 | 9.0 | 9.0 | 9.0 | 7.5 | 7.0 | 7.5 | 75 | 7.5 |
| | Moisture resistance (70° C. 98% RH3000 h) | | | | 7.5 | 7.5 | 7.5 | 7.5 | 8.5 | 7.5 | 8.0 | 8.5 | 7.5 |
| | Hydrophilicity | | | | 20 | 20 | 20 | 20 | 22 | 21 | 20 | 21 | 20 |
| | Odor | | | | 1.0 | 1.5 | 1.0 | 1.5 | 1.0 | 1.0 | 1.0 | 1.0 | 1.5 |

TABLE 3

| | | | | Comparative Example | | | | | |
|---|---|---|---|---|---|---|---|---|---|
| | | | | 1 | 2 | 3 | 4 | 5 | 6 |
| Chemical conversion treatment agent | | Zr | Concentration: ppm | — | 500 | — | 1000 | 500 | 500 |
| | | Ti | Concentration: ppm | — | — | 200 | 100 | 50 | 50 |
| | | V | Concentration: ppm | 100 | — | — | — | 100 | 100 |
| | Metal stabilizer | Ascorbic acid | Concentration: ppm | 100 | 100 | 100 | 100 | 100 | — |
| | pH | | | 3.5 | 3.5 | 3.5 | 3.5 | 1.5 | 3.5 |
| Hydrophilization | Hydrophilic | Polyvinyl alcohol | Solid content % | 50 | 50 | 50 | 50 | 50 | 50 |
| | | Ethylene oxide- | Solid content % | 20 | 20 | 20 | 20 | 20 | 20 |

TABLE 3-continued

|  |  |  |  | Comparative Example | | | | | |
|---|---|---|---|---|---|---|---|---|---|
|  |  |  |  | 1 | 2 | 3 | 4 | 5 | 6 |
| treatment agent | resin | modified polyvinyl alcohol | Solid content % | — | — | — | — | — | — |
|  |  | Carboxymethylcellulose | Solid content % | — | — | — | — | — | — |
|  |  | Sodium polyvinyl sulfonate | Solid content % | — | — | — | — | — | — |
|  |  | Polyacrylic acid | Solid content % | — | — | — | — | — | — |
|  |  | Chitosan | Solid content % | — | — | — | — | — | — |
|  | Guanidine compound | 1-o-tolyl biguanide | Solid content % | — | — | — | — | — | — |
|  |  | Polyhexamethylene biguanide | Solid content % | 10 | 10 | 10 | 10 | 10 | 10 |
|  | Phosphorus-based compound | Phosphoric acid | Solid content % | — | — | — | — | — | — |
|  |  | Condensed phosphoric acid | Solid content % | — | — | — | — | — | — |
|  |  | Phytic acid | Solid content % | — | — | — | — | — | — |
|  |  | PBTC | Solid content % | — | — | — | — | — | — |
|  | Lithium | Lithium hydroxide | Solid content % | — | — | — | — | — | — |
|  | Additives | Silica | Solid content % | 20 | 20 | 20 | 20 | 20 | 20 |
|  |  | Phenol resin | Solid content % | — | — | — | — | — | — |
| Film amount | Chemical conversion film | Zr | mg/m² | — | 37 | — | 53 | 7 | 34 |
|  |  | Ti | mg/m² | — | — | 41 | 36 | 9 | 27 |
|  |  | V | mg/m² | 4 | — | — | — | 5 | 25 |
|  |  | C (metal stabilizer) | mg/m² | 4 | 6 | 3 | 4 | 2 | — |
|  | Hydrophilized film |  | g/m² | 0.2 | 0.2 | 0.2 | 0.2 | 0.2 | 0.2 |
| Heat exchanger |  |  |  | NB | NB | NB | NB | NB | NB |
| Evaluation results |  | Corrosion resistance (2000 h) |  | 3.0 | 5.0 | 4.0 | 5.0 | 4.0 | 9.0 |
|  |  | Moisture resistance (70° C. 98% RH3000 h) |  | 2.0 | 3.0 | 3.0 | 3.0 | 3.0 | 3.0 |
|  |  | Hydrophilicity |  | 20 | 20 | 20 | 20 | 20 | 20 |
|  |  | Odor |  | 1.0 | 1.0 | 1.0 | 1.0 | 1.0 | 1.0 |

The details of each component in Table 1 to Table 3 are as follows.

(1) In the chemical conversion treatment agent, Zr concentration represents the zirconium content in the chemical conversion treatment agent (concentration of various ions in terms of the metal element)), Ti concentration represents the titanium content in the chemical conversion treatment agent (concentration of various ions in terms of the metal element), and V concentration represents the vanadium content in the chemical conversion treatment agent (concentration of various ions in terms of the metal element).

(2) The concentration of metal stabilizer in the chemical conversion treatment agent is the content of metal stabilizer relative to the chemical conversion treatment agent.

(3) Aruberi L of the metal stabilizer is the anthocyanin.

(4) Pancil FG-70 of the metal stabilizer is the catechin.

(5) PL-6757 of the metal stabilizer is the polyphenol.

(6) Baypure CX-100 of the metal stabilizer is the tetrasodium iminodisuccinate.

(7) Solid content % of each component in the hydrophilization treatment agent represents the content of each component relative to the solid content of the hydrophilization treatment agent.

(8) Degree of saponification of polyvinyl alcohol is 99%, and the number average molecular weight thereof is 60,000.

(9) Degree of saponification of ethyleneoxide-modified polyvinyl alcohol is 99%, the number average molecular weight thereof is 20,000, and the content ratio of polyoxyethylene groups (proportion of polyvinyl alcohol relative to total pendant groups) is 3%.

(10) The number average molecular weight of carboxymethylcellulose is 10,000.

(11) The number average molecular weight of sodium polyvinyl sulfonate is 20,000.

(12) The number average molecular weight of polyacrylic acid is 20,000.

(13) The weight average molecular weight of chitosan is 430,000. Since it is necessary for chitosan to dissolve in citric acid, citric acid is also simultaneously contained in the case of using chitosan.

(14) The condensed phosphoric acid is tripolyphosphoric acid.

(15) PBTC represents phosphonobutane tricarboxylic acid.

(16) The phenol resin is an organic cross-linker consisting of resol-type phenol resin, and the number average molecular weight thereof is 300.

As shown in Table 1 to Table 3, all of Examples 1 to 38 are superior in corrosion resistance and moisture resistance compared to Comparative Examples 1 to 5, and are superior in moisture resistance even when comparing with Comparative Example 6; the hydrophilicity and odor (odor resistance) were found to be favorable without any inferiority. From these results, it has been confirmed that more superior corrosion resistance and moisture resistance than conventionally were obtained by forming a hydrophilized film by chemical conversion treating the NB heat exchanger and VB heat exchanger with a chemical conversion treatment agent containing at least one among zirconium and titanium, the content thereof being 5 to 5,000 ppm by mass in total, containing vanadium, the content thereof being 10 to 1,000 ppm by mass, containing metal stabilizer, the content thereof being 5 to 5,000 ppm by mass, as well as having a pH of 2 to 6 to form a chemical conversion film, followed by bringing into contact with a hydrophilization treatment agent containing hydrophilic resin and baking.

INDUSTRIAL APPLICABILITY

According to the surface treatment method of aluminum heat exchanger of the present invention, since it is possible to impart superior corrosion resistance and moisture resistance even to a heat exchanger on which flux remains on the surfaces of fins, etc., the surface treatment method of the present invention is preferably applied to the surface treatment of aluminum heat exchanger for automobile air-conditioning.

The invention claimed is:
1. A surface treatment method for an aluminum heat exchanger, comprising:
   (a) a step of forming a chemical conversion film on a surface of the aluminum heat exchanger using a chemical conversion treatment agent;
   (b) a step of bringing the aluminum heat exchanger on which the chemical conversion film was formed on the surface in the step (a) into contact with a hydrophilization treatment agent containing a hydrophilic resin; and
   (c) a step of forming a hydrophilized film on the surface by baking the aluminum heat exchanger that was contact treated in the step (b),
   wherein the chemical conversion treatment agent used in the step (a) contains both zirconium and titanium, wherein a content thereof is 10 to 2,500 ppm by mass in total, contains vanadium, wherein a content thereof is 100 to 500 ppm by mass, contains a metal stabilizer, wherein a content thereof is 10 to 2,000 ppm by mass, and has a pH of 3 to 5.
2. The surface treatment method for aluminum heat exchanger according to claim 1, wherein the metal stabilizer is at least one selected from the group consisting of organic compounds having reducibility and iminodiacetic acid derivatives.
3. The surface treatment method for aluminum heat exchanger according to claim 2, wherein:
   in the chemical conversion film formed in the step (a), a total of an amount of zirconium and an amount of titanium is 5 to 300 mg/m$^2$, an amount of vanadium is 1 to 150 mg/m$^2$, and an amount of metal stabilizer is 0.5 to 200 mg/m$^2$ in terms of carbon, and
   a film amount of the hydrophilized film formed in the step (c) is 0.05 to 5 g/m$^2$.
4. The surface treatment method for aluminum heat exchanger according to claim 2, wherein
   the hydrophilization treatment agent used in the step (b) further comprises at least one of a guanidine compound represented by general formula (1) below and a salt thereof,

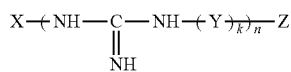
(1)

wherein, in formula (1), Y represents —C(=NH)—(CH$_2$)$_m$—, —C(=O)—NH—(CH$_2$)$_m$—, or —C(=S)—NH—(CH$_2$)$_m$—;
m represents an integer of 0 to 20; n represents a positive integer; k represents 0 or 1;
X represents hydrogen, an amino group, hydroxyl group, methyl group, phenyl group, chlorophenyl group or methylphenyl group;
Z represents hydrogen, an amino group, hydroxyl group, methyl group, phenyl group, chlorophenyl group, methylphenyl group, or a polymer represented by general formula (2) below having a mass average molecular weight of 200 to 1,000,000; and

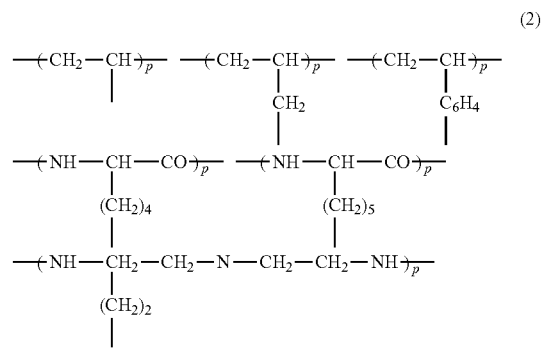
(2)

wherein p in formula (2) represents a positive integer.
5. The surface treatment method for aluminum heat exchanger according to claim 4, wherein the guanidine compound and salt thereof are a compound having a biguanide structure represented by general formula (3) below and a salt thereof

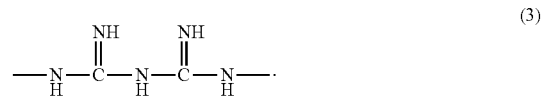
(3)

6. The surface treatment method for aluminum heat exchanger according to claim 4, wherein
   the hydrophilization treatment agent used in the step (b) further comprises at least one selected from the group consisting of phosphoric acid, condensed phosphoric acid, phosphonic acid, derivatives thereof and lithium ion.
7. The surface treatment method for aluminum heat exchanger according to claim 4, wherein
   the hydrophilic resin in the hydrophilization treatment agent used in the step (b) further comprises at least one of a polyvinyl alcohol and a modified-polyvinyl alcohol having a degree of saponification of at least 90%.
8. The surface treatment method for aluminum heat exchanger according to claim 4, wherein the aluminum heat exchanger is flux brazed.
9. The surface treatment method for aluminum heat exchanger according to claim 4, wherein the aluminum heat exchanger is flux brazed according to the Nocolok brazing process.
10. The according to claim 1, wherein the hydrophilization treatment agent used in the step (b) further comprises at least one of a guanidine compound represented by general formula (1) below and a salt thereof,

(1)

wherein, in formula (1), Y represents —C(=NH)—(CH$_2$)$_m$—, —C(=O)—NH—(CH$_2$)$_m$—, or —C(=S)—NH—(CH$_2$)$_m$—;
m represents an integer of 0 to 20; n represents a positive integer; k represents 0 or 1;
X represents hydrogen, an amino group, hydroxyl group, methyl group, phenyl group, chlorophenyl group or methylphenyl group;

Z represents hydrogen, an amino group, hydroxyl group, methyl group, phenyl group, chlorophenyl group, methylphenyl group, or a polymer represented by general formula (2) below having a mass average molecular weight of 200 to 1,000,000; and

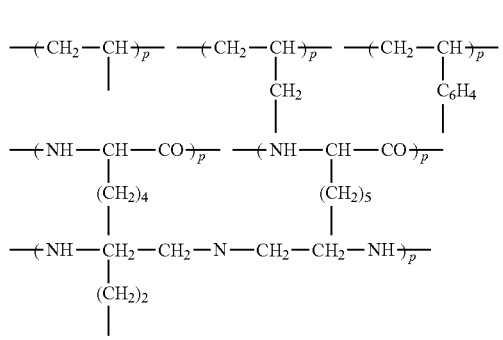

wherein p in formula (2) represents a positive integer.

11. An aluminum heat exchanger, comprising:
a chemical conversion film formed on a surface of the aluminum heat exchanger using a chemical conversion treatment agent;
a hydrophilized film formed by baking treatment, after bringing the aluminum heat exchanger on which the chemical conversion film was formed into contact with a hydrophilization treatment agent containing a hydrophilic resin,
wherein the chemical conversion film is formed by the chemical conversion treatment agent that contains both zirconium and titanium, wherein a content thereof is 10 to 2,500 ppm by mass in total, contains vanadium, wherein a content thereof is 100 to 500 ppm by mass, contains a metal stabilizer, wherein a content thereof is 10 to 2,000 ppm by mass, and has a pH of 3 to 5,
wherein the metal stabilizer is at least one selected from the group consisting of organic compounds having reducibility and iminodiacetic acid derivatives, and
wherein the chemical conversion film includes the metal stabilizer.

12. The aluminum heat exchanger according to claim 11, wherein in the chemical conversion film, a total of an amount of zirconium and an amount of titanium is 5 to 300 mg/m$^2$, an amount of vanadium is 1 to 150 mg/m$^2$, and an amount of metal stabilizer is 0.5 to 200 mg/m$^2$ in terms of carbon, and a film amount of the hydrophilized film is 0.05 to 5 g/m$^2$.

13. The aluminum heat exchanger according to claim 11, wherein
the hydrophilization treatment agent further comprises at least one of a guanidine compound represented by general formula (1) below and a salt thereof, and
the chemical conversion film includes the hydrophilic resin and at least one of a guanidine compound represented by general formula (1) below and a salt thereof,

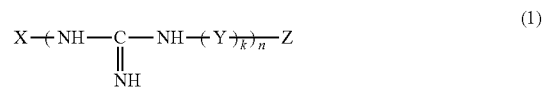

wherein, in formula (1), Y represents —C(=NH)—(CH$_2$)$_m$—, —C(=O)—NH—(CH$_2$)$_m$—, or —C(=S)—NH—(CH$_2$)$_m$;
m represents an integer of 0 to 20; n represents a positive integer; k represents 0 or 1;
X represents hydrogen, an amino group, hydroxyl group, methyl group, phenyl group, chlorophenyl group or methylphenyl group;
Z represents hydrogen, an amino group, hydroxyl group, methyl group, phenyl group, chlorophenyl group, methylphenyl group, or a polymer represented by general formula (2) below having a mass average molecular weight of 200 to 1,000,000; and

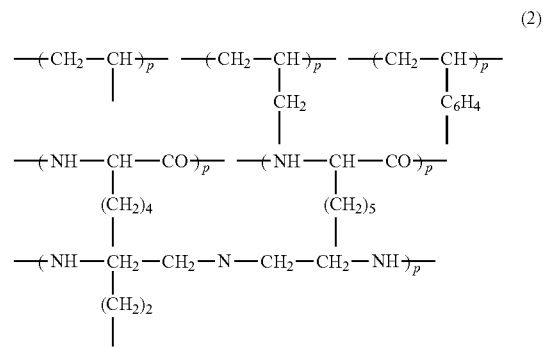

wherein p in formula (2) represents a positive integer.

14. The aluminum heat exchanger according to claim 13, wherein the guanidine compound and salt thereof are a compound having a biguanide structure represented by general formula (3) below and a salt thereof

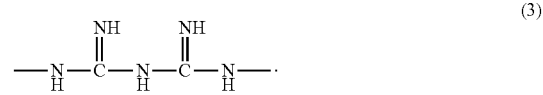

15. The aluminum heat exchanger according to claim 11, wherein the hydrophilic resin further comprises at least one of a polyvinyl alcohol and modified-polyvinyl alcohol having a degree of saponification of at least 90%.

16. The aluminum heat exchanger according to claim 11, wherein the aluminum heat exchanger is flux brazed.

17. The aluminum heat exchanger according to claim 11, wherein the aluminum heat exchanger is flux brazed according to the Nocolok brazing process.

* * * * *